(12) United States Patent
Austrheim

(10) Patent No.: US 11,993,163 B2
(45) Date of Patent: May 28, 2024

(54) AUTOMATED STORAGE SYSTEM WITH A CONTAINER VEHICLE AND A CHARGING SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 616 days.

(21) Appl. No.: 17/054,183

(22) PCT Filed: Jun. 11, 2019

(86) PCT No.: PCT/EP2019/065241
§ 371 (c)(1),
(2) Date: Nov. 10, 2020

(87) PCT Pub. No.: WO2019/238702
PCT Pub. Date: Dec. 19, 2019

(65) Prior Publication Data
US 2021/0162877 A1   Jun. 3, 2021

(30) Foreign Application Priority Data

Jun. 12, 2018   (NO) .................................... 20180813
Aug. 2, 2018    (NO) .................................... 20181039
(Continued)

(51) Int. Cl.
*B60L 53/16*    (2019.01)
*B60L 53/30*    (2019.01)
(Continued)

(52) U.S. Cl.
CPC ............... *B60L 53/16* (2019.02); *B60L 53/30* (2019.02); *B65G 1/0464* (2013.01);
(Continued)

(58) Field of Classification Search
CPC ...... B60L 53/16; B60L 53/60; B60L 2200/26; B65G 1/0464; B65G 1/0492; B65G 1/065
(Continued)

(56) References Cited

U.S. PATENT DOCUMENTS 3,519,150 A   7/1970   Keena et al.
3,800,963 A   4/1974   Holland
(Continued)

FOREIGN PATENT DOCUMENTS

CA   2988122 A1   12/2016
CN   101553416 A   10/2009
(Continued)

OTHER PUBLICATIONS

Office Action issued in the counterpart Chinese Patent Application No. 201980037723X, dated Sep. 17, 2021 (25 pages).
(Continued)

*Primary Examiner* — Nathaniel R Pelton
(74) *Attorney, Agent, or Firm* — Osha Bergman Watanabe & Burton LLP

(57) ABSTRACT

The present invention provides a storage system comprising at least one container vehicle (6',300',400), a horizontal rail grid (108,5) and a charging system for charging a rechargeable power source (20) of the container vehicle, wherein the container vehicle comprises a first set of wheels (32a) and a second set of wheels (32b) for moving the container vehicle upon the rail grid; the first set of wheels (32a) is displaceable in a vertical direction between a first position, wherein the first set of wheels may move the container vehicle in a first direction (X), a second position, wherein the first and the second set of wheels are in contact with the rail grid, and a third position wherein the second set of wheels may move the container vehicle in a second direction (Y) perpendicular to the first direction; the charging system comprises two
(Continued)

separated charge-receiving elements (21a,21b) arranged on the container vehicle and connected to the power source (20), and a charging station (22) comprising two separated charge-providing elements (23a,23b) connected to a power source charger (24); and each of the charge-receiving elements (21) comprises a first contact surface (25), and each of the charge-providing elements (23a,23b) comprises a second contact surface (26); wherein the first contact surfaces are arranged to be contactable with the corresponding second contact surfaces when the container vehicle is positioned above the charge-providing elements.

13 Claims, 27 Drawing Sheets

(30) Foreign Application Priority Data

Feb. 19, 2019 (NO) .................................. 20190224
Jul. 19, 2019 (NO) .................................. 20181005

(51) Int. Cl.
  *B65G 1/04* (2006.01)
  *B65G 1/06* (2006.01)

(52) U.S. Cl.
  CPC ........... *B65G 1/0492* (2013.01); *B65G 1/065* (2013.01); *B60L 2200/26* (2013.01)

(58) Field of Classification Search
  USPC .................................................. 320/107, 109
  See application file for complete search history.

(56) References Cited

U.S. PATENT DOCUMENTS

| | | | |
|---|---|---|---|
| 4,538,950 A | 9/1985 | Shiomi et al. | |
| 4,909,697 A | 3/1990 | Bernard, II et al. | |
| 5,538,809 A | 7/1996 | Bittihn et al. | |
| 7,101,139 B1 | 9/2006 | Benedict | |
| 8,628,289 B1 | 1/2014 | Benedict et al. | |
| 9,371,184 B1 | 6/2016 | Dingle et al. | |
| 9,527,669 B1 | 12/2016 | Hanssen et al. | |
| 2003/0093176 A1 | 5/2003 | Ohtsuka et al. | |
| 2005/0047895 A1 | 3/2005 | Lert | |
| 2005/0118003 A1 | 6/2005 | Mitchell et al. | |
| 2011/0027059 A1 | 2/2011 | Benedict et al. | |
| 2012/0282068 A1 | 11/2012 | Tschurwald et al. | |
| 2013/0049677 A1* | 2/2013 | Bouman .................... B60L 1/02 320/106 |
| 2014/0014470 A1 | 1/2014 | Razumov | |
| 2014/0086714 A1 | 3/2014 | Malik | |
| 2014/0277689 A1 | 9/2014 | Salichs | |
| 2014/0277693 A1 | 9/2014 | Naylor | |
| 2014/0288696 A1 | 9/2014 | Lert | |
| 2014/0292274 A1 | 10/2014 | Dorval et al. | |
| 2014/0311858 A1* | 10/2014 | Keating ............... B65G 1/0492 198/347.1 |
| 2015/0127143 A1 | 5/2015 | Lindbo et al. | |
| 2016/0060033 A1 | 3/2016 | Izumi | |
| 2016/0060037 A1 | 3/2016 | Razumov | |
| 2016/0145058 A1 | 5/2016 | Lindbo | |
| 2016/0176638 A1 | 6/2016 | Toebes | |
| 2016/0325932 A1* | 11/2016 | Hognaland .......... B65G 1/0478 |
| 2017/0050809 A1 | 2/2017 | Itoh et al. | |
| 2017/0057745 A1 | 3/2017 | Ueda et al. | |
| 2017/0166400 A1 | 6/2017 | Hofmann | |
| 2018/0044110 A1 | 2/2018 | Clarke et al. | |
| 2018/0068253 A1 | 3/2018 | Simms et al. | |
| 2018/0082162 A1 | 3/2018 | Durham et al. | |
| 2018/0118078 A1 | 5/2018 | Alkhaldi et al. | |
| 2018/0141754 A1 | 5/2018 | Garrett et al. | |
| 2018/0150793 A1 | 5/2018 | Lert, Jr. et al. | |
| 2019/0176633 A1* | 6/2019 | Booth .................... B60L 53/60 |
| 2020/0148474 A1 | 5/2020 | Salichs et al. | |

FOREIGN PATENT DOCUMENTS

| | | |
|---|---|---|
| CN | 101711210 A | 5/2010 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 | 6/2017 |
| CN | 206790852 U | 12/2017 |
| CN | 108140168 A | 6/2018 |
| DE | 40 16 810 C1 | 11/1991 |
| DE | 9310690 U1 | 9/1993 |
| DE | 102006017241 | 10/2010 |
| DE | 102009049563 | 4/2011 |
| DE | 102013009340 | 12/2014 |
| EP | 0458021 | 11/1991 |
| EP | 2881905 A1 | 6/2015 |
| EP | 3003932 A1 | 4/2016 |
| EP | 3288865 A1 | 3/2018 |
| GB | 1267751 A | 3/1972 |
| GB | 1276160 A | 6/1972 |
| GB | 2211822 | 7/1989 |
| GB | 2233319 A | 1/1991 |
| JP | S60-137703 A | 7/1985 |
| JP | S64-017707 A | 1/1989 |
| JP | H06-043936 A | 2/1994 |
| JP | H07-067623 B2 | 7/1995 |
| JP | H08-217209 A | 8/1996 |
| JP | H09152914 A | 6/1997 |
| JP | H11-143538 A | 5/1999 |
| JP | 2000044010 | 2/2000 |
| JP | 2000-191106 A | 7/2000 |
| JP | 2003-137406 A | 5/2003 |
| JP | 2009-184775 A | 8/2009 |
| JP | 2009-541177 A | 11/2009 |
| JP | 2011-102166 A | 5/2011 |
| JP | 102050333 A | 5/2011 |
| JP | 2015-535517 A | 12/2015 |
| JP | 2017088404 A | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 9614258 A1 | 5/1996 |
| WO | 2005/077789 A1 | 8/2005 |
| WO | 2005077789 | 8/2005 |
| WO | WO 2005/077789 * | 8/2005 |
| WO | 2012106746 A1 | 8/2012 |
| WO | 2012127419 | 9/2012 |
| WO | 2014/075937 A1 | 5/2014 |
| WO | 2014090684 | 6/2014 |
| WO | 2014/195901 A1 | 12/2014 |
| WO | 2014195901 | 12/2014 |
| WO | 2014203126 | 12/2014 |
| WO | 2015084236 A1 | 6/2015 |
| WO | 2015104263 | 7/2015 |
| WO | 2015/140216 A1 | 9/2015 |
| WO | 2015/170660 A1 | 11/2015 |
| WO | 2015193278 | 12/2015 |
| WO | 2016/166323 A1 | 10/2016 |
| WO | 2016166294 A1 | 10/2016 |
| WO | 2016172793 A1 | 11/2016 |
| WO | 2016196815 | 12/2016 |
| WO | 2016198467 | 12/2016 |
| WO | 2017081273 A1 | 5/2017 |

(56) References Cited

FOREIGN PATENT DOCUMENTS

| WO | 2017081281 A1 | 5/2017 |
| WO | 2017/121512 A1 | 7/2017 |
| WO | 2017121515 A1 | 7/2017 |
| WO | 2017144054 | 8/2017 |
| WO | 2017/153563 A1 | 9/2017 |
| WO | 2017211640 | 12/2017 |
| WO | 2017220627 | 12/2017 |
| WO | 2017220651 | 12/2017 |
| WO | 2018/162757 A1 | 9/2018 |
| WO | 2019/206440 A1 | 10/2019 |
| WO | 2019238702 | 12/2019 |

OTHER PUBLICATIONS

Office Action issued in the counterpart Chinese Patent Application No. 2019800383353, dated Dec. 17, 2021 (3 pages).
Office Action in counterpart Chinese Patent Application No. 2019800396936 dated Oct. 18, 2021 (6 pages).
Office Action in counterpart Chinese Patent Application No. 201980038106.1 dated Sep. 8, 2021 (10 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
Office Action issued in Chinese Application No. 201980039066.2 dated Sep. 10, 2021 (6 pages).
Search Report issued in Chinese Application No. 201980039066.2 dated Sep. 6, 2021 (2 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
Office Action issued in counterpart Japanese Patent Application No. 2020-568727 dated Mar. 30, 2023 (8 pages).
ISR of Sep. 12, 2019, cited inter alia as statement of relevance for any non-English references cited threrein.
ISR of Sep. 27, 2019, cited inter alia as statement of relevance for any non-English references cited threrein.
NOSR of Sep. 19, 2019, cited inter alia as statement of relevance for any non-English references cited threrein.
NOSR of Feb. 6, 2019, cited inter alia as statement of relevance for any non-English references cited threrein.
NOSR of Sep. 20, 2018, cited inter alia as statement of relevance for any non-English references cited threrein.
United States Office Action in related U.S. Appl. No. 16/972,482, dated Mar. 22, 2022 (46 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action issued in Chinese Application No. 2019800388569 dated Oct. 19, 2021 (16 pages).
Office Action issued in Chinese Application No. 201980039046.5 dated Sep. 15, 2021 (18 pages).
Office Action issued in counterpart Japanese Patent Application No. 2020-569128 dated Jul. 3, 2023 (6 pages).
Office Action issued in counterpart Japanese Patent Application No. 2020-568698 dated May 29, 2023 (9 pages).
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (7 pages).
Office Action issued in counterpart Japanese Patent Application No. 2020-568712 dated Jun. 26, 2023 (7 pages).
Office Action issued in the counterpart European Patent Application No. 19730155.9, dated Sep. 4, 2023 (6 pages).

* cited by examiner

Fig. 12 (Detail A)

Fig. 23 (detail C)

AUTOMATED STORAGE SYSTEM WITH A CONTAINER VEHICLE AND A CHARGING SYSTEM

FIELD OF THE INVENTION

The present invention relates to an automated storage and retrieval system and a method for use of an automated storage and retrieval system.

BACKGROUND

FIGS. 1A and 2B disclose a typical prior art automated storage and retrieval system 1 with a framework structure 100. FIGS. 1B and 2B disclose prior art container-handling vehicles 200,300 operating in the system 1 disclosed in FIGS. 1A and 2A, respectively.

The framework structure 100 defines a storage grid 104 comprising a plurality of upright members 102 and optionally a plurality of horizontal members 103 supporting the upright members 102. The members 102, 103 may typically be made of metal, e.g. extruded aluminium profiles.

The storage grid 104 comprises multiple grid columns 112. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the of storage containers 106 in the stacks 107, and guides vertical movement of the containers 106, but does normally not otherwise support the storage containers 106 when stacked.

The automated storage and retrieval system 1 comprises a rail system 108 (or a top rail grid) arranged in a grid pattern across the top of the storage grid 104, on which rail system 108 a plurality of container-handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container-handling vehicles 200,300 in a first direction X across the top of the frame structure 100, and a second set of parallel rails 111 arranged perpendicular to the first set of rails 110 to guide movement of the container-handling vehicles 200,300 in a second direction Y which is perpendicular to the first direction X. In this way, the rail system 108 defines the upper ends of the grid columns 112 above which the container-handling vehicles 200,300 can move laterally, i.e. in a plane which is parallel to the horizontal X-Y plane. Commonly, at least one of the sets of rails 110,111 is made up of dual-track rails allowing two container-handling vehicles to pass each other on neighbouring grid cells 122. Dual-track rails are well-known and disclosed in for instance WO 2015/193278 A1 and WO 2015/140216 A1, the contents of which are incorporated herein by reference.

Each prior art container-handling vehicle 200,300 comprises a vehicle body and a wheel arrangement of eight wheels 201,301, wherein a first set of four wheels enable the lateral movement of the container-handling vehicles 200, 300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container-handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and for the purpose of this application, Z=1 identifies the uppermost layer of the grid 104, i.e. the layer immediately below the rail system 108, Z=2 the second layer below the rail system 108, Z=3 the third layer etc. In the prior art storage grid disclosed in FIGS. 1A and 2A, Z=8 identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell X=10, Y=2, Z=3. The container-handling vehicles 200,300 can be said to travel in layer Z=0 and each grid column can be identified by its X and Y coordinates.

Each container-handling vehicle 200 comprises a storage compartment or space (not shown) for receiving and stowing a storage container 106 when transporting the storage container 106 across the top of the storage grid 104. The storage space may comprise a cavity arranged centrally within the vehicle body, e.g. as is described in WO2014/090684A1, the contents of which are incorporated herein by reference.

Alternatively, the container-handling vehicles 300 may have a cantilever construction as described in NO 317366, the contents of which are also incorporated herein by reference.

The container-handling vehicles 200 may have a footprint, i.e. an extent in the X and Y directions, which is generally equal to the horizontal area of a grid cell 122, i.e. the extent of a grid cell 122 in the X and Y directions, e.g. as is described in WO2015/193278A1, the contents of which are incorporated herein by reference.

Alternatively, the container-handling vehicles 200 may have a footprint which is larger than the horizontal area of a grid cell 122, e.g. as is disclosed in WO2014/090684A1.

The prior art container-handling vehicles comprises a rechargeable battery for driving the vehicle and operating the lifting device. The battery of the container-handling vehicle is recharged at a charging station (not shown). Commonly, the vehicle and the charging station features a plug/pin and socket interface. A plug/pin 27 for coupling to a socket of a charging station is shown on the prior art container-handling vehicle 300 in FIG. 2. The battery of the prior art container-handling vehicle 300 is recharged by moving the vehicle towards the charging station, such that the plug/pin 27 is inserted into a corresponding socket on the charging station. When the battery is charged, the vehicle is moved away from the charging station to disconnect the plug/pin from the socket. Charging systems, wherein the container-handling vehicle features a replaceable and rechargeable battery are known and disclosed in for instance WO 2015/104263 A2.

A common feature of the prior art charging stations/systems is the use of a charging interface featuring a plug/pin on the vehicle and a corresponding socket on the charging station (or vice versa). Such an interface requires a very high precision during connection and is vulnerable to wear. Further, the prior art interface s requiring a horizontal coupling movement limit the practical charging current that may be employed. The reason for the current limitation is that an increased current requires a correspondingly larger plug/socket which increases the friction between the two parts of the interface and consequently the force required to connect/disconnect the plug/socket. The container-handling vehicle 300 may only provide a certain push/pull force in the horizontal plane limited by the friction between the wheels and the rails. Consequently, if the plug/socket is too large, the container-handling vehicle will not be able to connect/disconnect the plug/pin from the socket.

In view of the above, the aim of the present invention is to provide an automated storage and retrieval system, and a method for operating such a system, that solves or at least mitigates one or more of the problems related to the charging systems of the prior art storage and retrieval systems.

SUMMARY OF THE INVENTION

The present invention is defined by the appended claims and in the following:

In a first aspect, the present invention provides a storage system comprising at least one container vehicle, a horizontal rail grid and a charging system for charging a rechargeable power source of the container vehicle, wherein
- the container vehicle comprises a first set of wheels and a second set of wheels for moving the container vehicle upon the rail grid;
- the first set of wheels is displaceable in a vertical direction between a first position, wherein the first set of wheels may move the container vehicle in a first direction, a second position, wherein the first and the second set of wheels are in contact with the rail grid, and a third position wherein the second set of wheels may move the container vehicle in a second direction perpendicular to the first direction;
- the charging system comprises two separated charge-receiving elements arranged on the container vehicle and connected to the power source, and a charging station comprising two separated charge-providing elements connected to a power source charger; and
- each of the charge-receiving elements comprises a first contact surface, and each of the charge-providing elements comprises a second contact surface;

wherein the first contact surfaces are arranged to be contactable with the corresponding second contact surfaces when the container vehicle is positioned above the charge-providing elements.

In other words, the first set of wheels may be displaceable in a vertical direction relative to a vehicle body of the container vehicle and relative to the second set of wheels. The first set of wheels may be arranged such that the vehicle body is lowered towards the rail grid when the first set of wheels is displaced from the first to the second or third position. In other words, the first set of wheels may be arranged such that the vehicle body is lowered towards the charging station when the first set of wheels is displaced from the first to the second or third position.

In other words, the first contact surfaces may be brought into contact with, or are in contact with, the corresponding second contact surfaces when the first contact surfaces are positioned directly above the second contact surfaces.

In other words, the first contact surfaces may be brought into contact with, or are in contact with, the corresponding second contact surfaces when the first contact surfaces are positioned directly above the second contact surfaces. In other words, the first contact surfaces may be brought into contact with, or are in contact with, the corresponding second contact surfaces when the first contact surfaces are vertically aligned with the second contact surfaces.

In other words, the first contact surfaces are arranged to be contactable with the corresponding second contact surfaces when the container vehicle is positioned above the charge-providing elements and the container vehicle is lowered. The container vehicle may be lowered by displacing the first set of wheels in a vertical direction from the first position.

In other words, the first contact surfaces may be arranged to be contactable with the corresponding second contact surfaces when the container vehicle is positioned above the charge-providing elements and the first set of wheels is in the second or third position.

In an embodiment, the two charge-providing elements provides a direct current, i.e. one of the charge-providing elements is DC− and the other DC+.

In an embodiment of the storage system, the first contact surfaces may be complementary with the corresponding second contact surfaces. The first contact surfaces may be arranged to be pushed or forced against the respective second contact surfaces when the container vehicle is positioned above the charge-providing elements and the container vehicle is lowered.

In an embodiment of the storage system, the first contact surfaces and the second contact surfaces may be flat, or the first contact surfaces may be complementary with the corresponding second contact surfaces. In other words, when the first and the second contact surfaces are brought into contact with each other they provide a contact area between them being substantially equal to the area of the first contact surfaces or the second contact surfaces.

In an embodiment, the charge-receiving elements is only in contact with the charge-providing elements via the first contact surfaces.

In an embodiment of the storage system, a contact area between the charge-receiving elements and the charge-providing elements may be equal to the area of the first contact surface.

In an embodiment, the first and the second contact surfaces may face each other in a vertical direction. The first and the second contact surfaces may be arranged to be moved towards each other when the container vehicle or vehicle body is lowered towards the rail grid, i.e. when the first set of wheels are displaced in an upwards direction from the first position.

In an embodiment, the first and second contact surfaces may be flat surfaces arranged in a horizontal plane.

In an embodiment of the storage system, the rechargeable power source may be a battery or a capacitor.

In an embodiment of the storage system, the first contact surfaces may face downwards, and the second contact surfaces may face upwards.

In an embodiment of the storage system, each of the second contact surfaces may have an area, i.e. both the width in the x-direction and the length in the y-direction, that is larger than the corresponding first contact surfaces, or vice versa. This feature allows for an increased tolerance in the positioning of the container vehicle during charging.

In an embodiment of the storage system, the two charge-receiving elements may only be contactable with the corresponding two charge-providing elements via the respective first and second contact surfaces. In other words, when the container vehicle is positioned above the charge-providing elements and the first set of wheels is in the second or third position, the two charge receiving elements are only in conductive contact with the corresponding two charge-providing elements via the respective first and second contact surfaces.

In an embodiment of the storage system, the first contact surfaces and the second contact surfaces may be arranged at a level above the rail grid. In other words, the first and the second contact surfaces are arranged at a level above the upper level of the rails making up the rail grid.

In an embodiment of the storage system, the charge-receiving elements or the charge-providing elements may be operatively connected to a resilient assembly arranged to allow the first contact surfaces or the second contact surfaces, respectively, to be pushed in a vertical direction opposite the direction in which the first or second contact surfaces, respectively, are facing. In other words, the resilient assembly allows the first or second contact surfaces to move resiliently in a vertical direction. The resilient assembly may bias the charge-receiving elements or the charge-providing elements in a vertical direction towards the charge-providing elements and the charge-receiving elements, respectively.

In an embodiment of the storage system, the charge-receiving elements may be resiliently connected to a bottom section of the vehicle body, such that the first contact surfaces may move resiliently in a vertical direction relative the vehicle body. In other words, the charge-receiving elements may be resiliently connected to a bottom section of the vehicle body, e.g. via a resilient assembly, such that they may move resiliently in a vertical direction relative the vehicle body. The charge-receiving elements may be biased in a vertically downwards direction.

In an embodiment of the storage system, the resilient assembly may comprise a rigid support element, such as a plate, to which the charge-receiving elements are connected, and at least one resilient element, such as a spring, and the rigid support element is connected to a bottom section of the vehicle body via the resilient element. The resilient element may be arranged to bias the charge-receiving elements in a vertically downwards direction.

In an embodiment of the storage system, the first contact surfaces are arranged to be in contact with the second contact surfaces when the container vehicle is positioned above the charge-providing elements and the first set of wheels are in the second or third position.

In an embodiment of the storage system, the first contact surfaces may be arranged to contact the second contact surfaces when the container vehicle is positioned above the charge-providing elements and the first set of wheels is displaced in a vertical direction.

In an embodiment of the storage system, the charging station may comprise a support structure to which the two charge-providing elements are connected, the support structure may be arranged within a single grid cell of the rail grid and at a level below the rails of the rail grid. The first contact surfaces may be brought into contact with the corresponding second contact surfaces when at least a section of the container vehicle comprising the first contact surfaces is positioned above the grid cell featuring the support structure. An advantage of having the support structure arranged within a single grid cell of the rail grid and at a level below the rails of the rail grid is that the charging station may be arranged anywhere on the rail grid without preventing movement of the container vehicle in any significant manner.

In an embodiment of the storage system, the second contact surfaces may be arranged at a level below the level of the first contact surfaces when the first set of wheels is in the first position. In other words, when the first set of wheels is in the first position, the container vehicle may pass above the grid cell comprising the charging station without having the first contact surfaces coming into contact with the second contact surfaces.

In an embodiment of the storage system, the second contact surfaces may be arranged at a level above the level of the first contact surfaces when the first set of wheels is in the second or third position and the container vehicle is not positioned above the charging station.

In an embodiment of the storage system, each charge-providing element comprises inclined guide surfaces arranged on opposite ends of the second contact surface and extending from the level of the second contact surface to a level below the level of the first contact surfaces when the first set of wheels is in the third position.

In an embodiment, the storage system may comprise a storage grid structure having vertical column profiles defining multiple storage columns, in which storage containers can be stored one on top of another in vertical stacks. The column profiles may be interconnected at their upper ends by top rails forming a horizontal top rail grid.

In an embodiment, the storage system comprises at least one horizontal transfer rail grid arranged at a level below the top rail grid.

In an embodiment of the storage system, the rail grid may be any of the top rail grid and the transfer rail grid.

In an embodiment of the storage system, the container vehicle may be any of a container handling vehicle arranged to move upon the top rail grid and a container transfer vehicle arranged to move upon the transfer rail grid.

In an embodiment of the storage system, the charging system comprises at least two separated charge-receiving elements arranged on the container vehicle and connected to the power source, and the charging station comprises at least two separated charge-providing elements connected to the power source charger.

In an embodiment of the storage system, the charging system comprises at least one first signal transfer element arranged on the container vehicle and connected to the power source, and the charging station comprises at least one second signal transfer element connected to the power source charger. The first and second signal transfer elements may be arranged to be in contact when the first contact surfaces are in contact with the corresponding second contact surfaces. The signal transfer elements may provide an alternative method for controlling the charging current.

In a second aspect, the present invention provides a container vehicle for a storage system according to the first aspect, comprising a vehicle body, a rechargeable power source, two charge-receiving elements, a first set of wheels and a second set of wheels, wherein
the first set of wheels and the second set of wheels are for moving the container vehicle upon a rail grid, and the first set of wheels is displaceable in a vertical direction between a first position, wherein the first set of wheels may move the container vehicle in a first direction, a second position, wherein the first and the second set of wheels are in contact with the rail grid, and a third position wherein the second set of wheels may move the container vehicle in a second direction perpendicular to the first direction;

the rechargeable power source is connected to the two charge-receiving elements; and the two charge-receiving elements are arranged at a bottom section of the container vehicle and each charge-receiving element comprises a first contact surface facing in a downwards direction.

In other words, the first set of wheels is displaceable in a vertical direction relative to the vehicle body of the container vehicle and relative to the second set of wheels. In other words, the first set of wheels may be arranged such that the vehicle body is lowered towards the rail grid when the first set of wheels is displaced from the first to the second position. In the first position the first set of wheels may be arranged at a level below the second set of wheels. The vehicle body may be at a higher level when the first set of wheels is in the first position than when the first set of wheels is in the second position.

In other words, when the first set of wheels is in the second position, the first and second set of wheels are arranged at the same level.

The container vehicle may comprise any of the features disclosed for the container vehicle defined in the first aspect of the invention.

In an embodiment, the container handling vehicle may comprise a container carrying arrangement. The container carrying arrangement may be able to accommodate a container when the container vehicle moves upon a rail grid.

In an embodiment of the container vehicle, the first contact surfaces are at a lower level relative the first set of wheels when the first set of wheels is in the second or third position than when the first set of wheels is in the first position. In other words, the level of the first contact surfaces relative an underlying rail grid may be adjusted from a lowermost level when the first set of wheels is in the second or third position to a highest level when the first set of wheels is in the first position.

In an embodiment of the container vehicle, the first contact surfaces may be arranged to be moved in a downwards direction when the first set of wheels is displaced in an upwards direction from the first position. In other words, the first contact surfaces may be arranged to be moved in a downwards direction towards an underlying rail grid when the first set of wheels is displaced in an upwards direction from the first position towards the second or third position.

In an embodiment of the container vehicle, the first contact surfaces may face in a downwards direction.

In an embodiment of the container vehicle the first contact surfaces may be flat/planar, and preferably arranged in a horizontal plane.

In an embodiment of the container vehicle, each of the charge-receiving elements comprises a vertically extended element having the first contact surface at its lower end. The vertically extended element may be a longitudinal element having a vertical longitudinal axis, such as a bolt.

In an embodiment of the container vehicle, the charge-receiving elements are connected to the vehicle body via a resilient assembly arranged to allow resilient vertical movement of the first contact surfaces. The resilient assembly may comprise a rigid support element, such as a plate, to which the charge-receiving elements are connected, and at least one resilient element, such as a spring, and the rigid support element is connected to a bottom section of the vehicle body via the resilient element.

In an embodiment of the container vehicle, the rechargeable power source may be arranged to provide electric power to at least one drive motor of the container vehicle.

In an embodiment of the container vehicle, the charge-receiving elements are arranged at a bottom section of the vehicle body. The bottom section may be arranged off-centre relative a horizontal cross-section of the container vehicle.

In an embodiment, the container handling vehicle comprises a cavity for accommodating a storage container, and the charge-receiving elements are arranged at a bottom section of the vehicle body positioned adjacent to the cavity.

In a third aspect, the present invention provides a charging station for a storage system according to the first aspect, comprising two charge-providing elements, a support structure for the charge-providing elements and a power source charger, the charge-providing elements are connected to the power source charger and comprises two flat/plane second contact surfaces for contact with corresponding charge-receiving elements connected to a rechargeable power source, each second contact surface arranged to be at a level above the support structure and arranged to face in an upwards direction during use.

In an embodiment of the charging station, the second contact surfaces may be arranged in a horizontal plane.

In an embodiment of the charging station, each of the charge-providing elements may comprise inclined guide surfaces arranged on opposite ends of the second contact surface and extending from the level of the second contact surface towards an upper level of the support structure. In other words, the end of the inclined guide surface being adjacent to the respective second contact surface is arranged at the same level as the second contact surface and the end being distal from the respective second contact surface is at a level below the level of the second contact surface.

In a fourth aspect, the present invention provides a method of charging a container vehicle in a storage system, the storage system comprising a horizontal rail grid and a charging system for charging a rechargeable power source of the container vehicle, wherein the container vehicle comprises a first set of wheels and a second set of wheels for moving the container vehicle upon the rail grid;

the first set of wheels is displaceable in a vertical direction between a first position, wherein the first set of wheels may move the container vehicle in a first direction, a second position, wherein the first and the second set of wheels are in contact with the rail grid, and a third position wherein the second set of wheels may move the container vehicle in a second direction perpendicular to the first direction;

the charging system comprises two charge-receiving elements arranged on the container vehicle and connected to the power source, and a charging station comprising two charge-providing elements connected to a power source charger; and each of the charge-receiving elements comprises a first contact surface, and each of the charge-providing elements comprises a second contact surface; wherein the method comprises the steps of:

moving the container vehicle in the first direction towards the charging station;

stopping the container vehicle in a position above the charge-providing elements; and displacing the first set of wheels from the first position to the second or third position to lower the first contact surfaces into contact with the second contact surfaces.

In a fifth aspect, the present invention provides a method of charging a container vehicle in a storage system, the storage system comprising a horizontal rail grid and a charging system for charging a rechargeable power source of the container vehicle, wherein the container vehicle comprises a first set of wheels and a second set of wheels for moving the container vehicle upon the rail grid;

the first set of wheels is displaceable in a vertical direction between a first position, wherein the first set of wheels may move the container vehicle in a first direction, a second position, wherein the first and the second set of wheels are in contact with the rail grid, and a third position wherein the second set of wheels may move the container vehicle in a second direction perpendicular to the first direction;

the charging system comprises two charge-receiving elements arranged on the container vehicle and connected to the power source, and a charging station comprising two charge-providing elements connected to a power source charger; and each of the charge-receiving elements comprises a first contact surface, and each of the charge-providing elements comprises a second contact surface; wherein the method comprises the steps of:

moving the container vehicle in the second direction towards the charging station; and stopping the container vehicle in a position above the charge-providing elements, wherein the first contact surfaces are in contact with the corresponding second contact surfaces.

In an embodiment, the method according to the fifth aspect may comprise a step of displacing the first set of wheels from the third position to the second position.

The methods according to the fourth and fifth aspect may comprise any of the technical features of the first, second and third aspects of the invention.

SHORT DESCRIPTION OF THE DRAWINGS

The present invention is described in detail below by way of example only and with reference to the following drawings:

FIGS. 1 and 2 are perspective views of a prior art automated storage and retrieval system, wherein FIG. 1A and FIG. 2A show the complete system and FIG. 1B and FIG. 2B show examples of prior art container-handling vehicles suitable for use in the system.

DETAILED DESCRIPTION OF THE INVENTION

Figure 1:
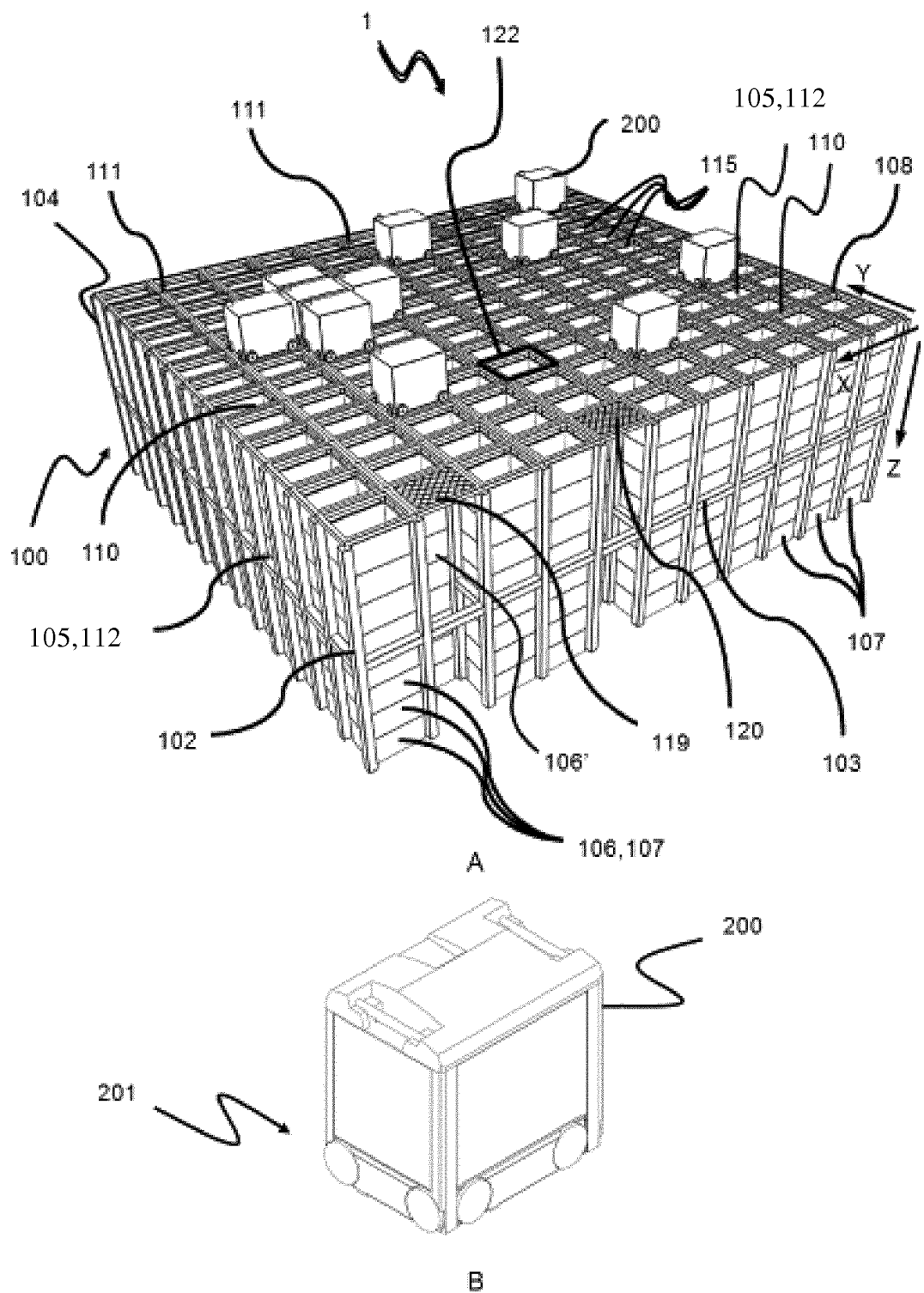

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the related methods as well, and vice versa.

Figure 2:
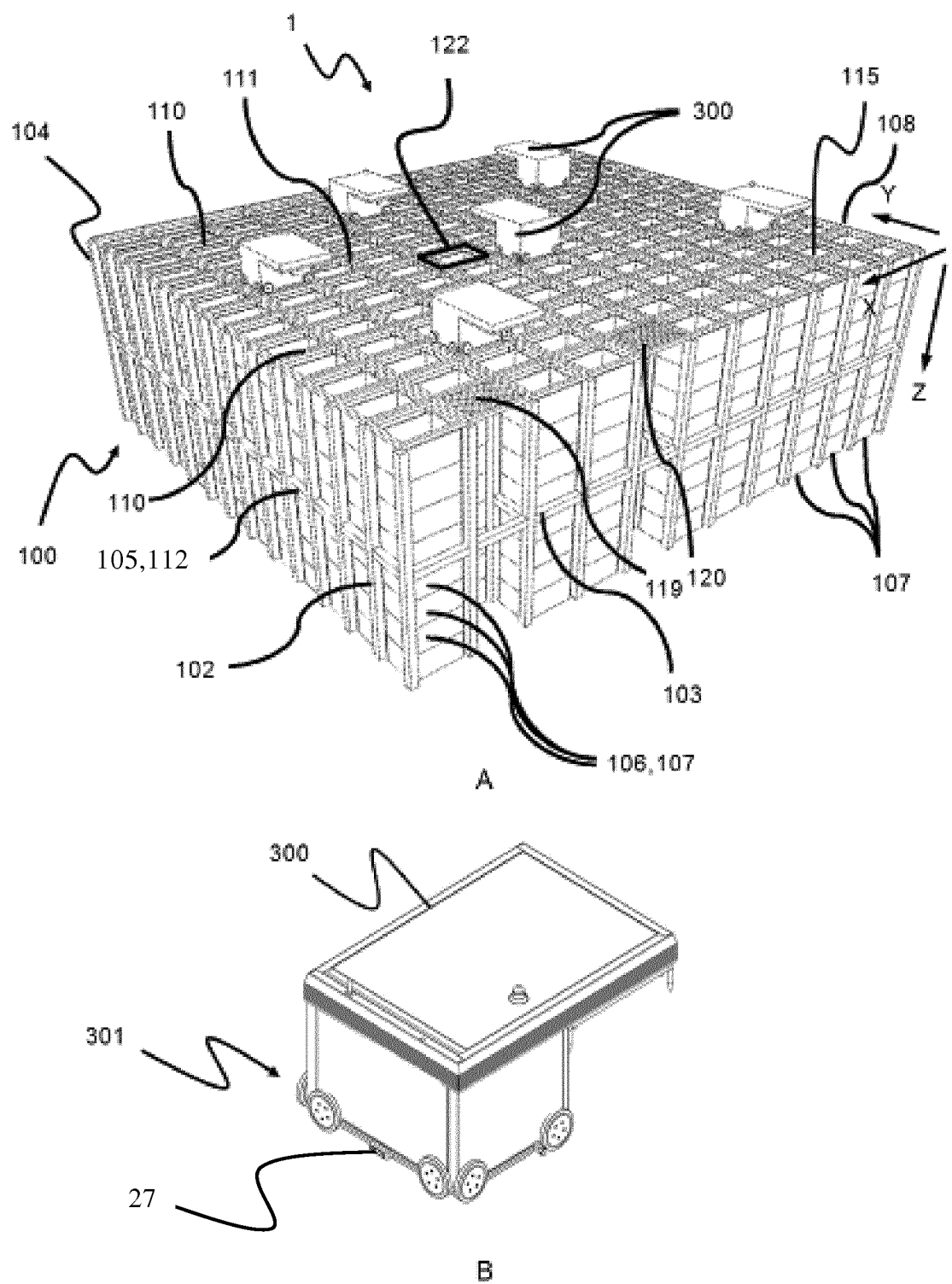
Figure 3:
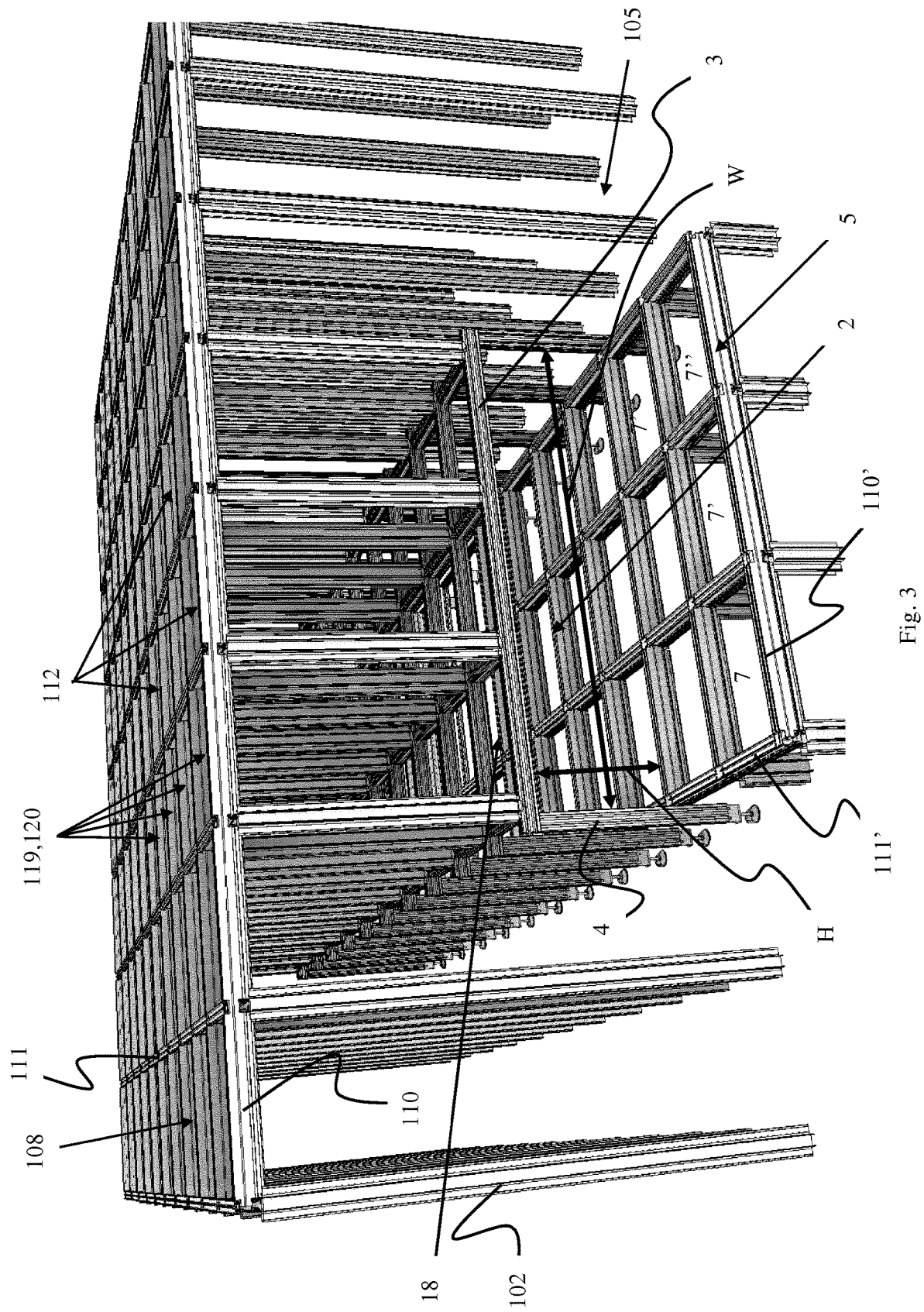
FIG. 3 is a perspective view of a first exemplary storage grid for use in a storage system according to the invention.
Figure 4:
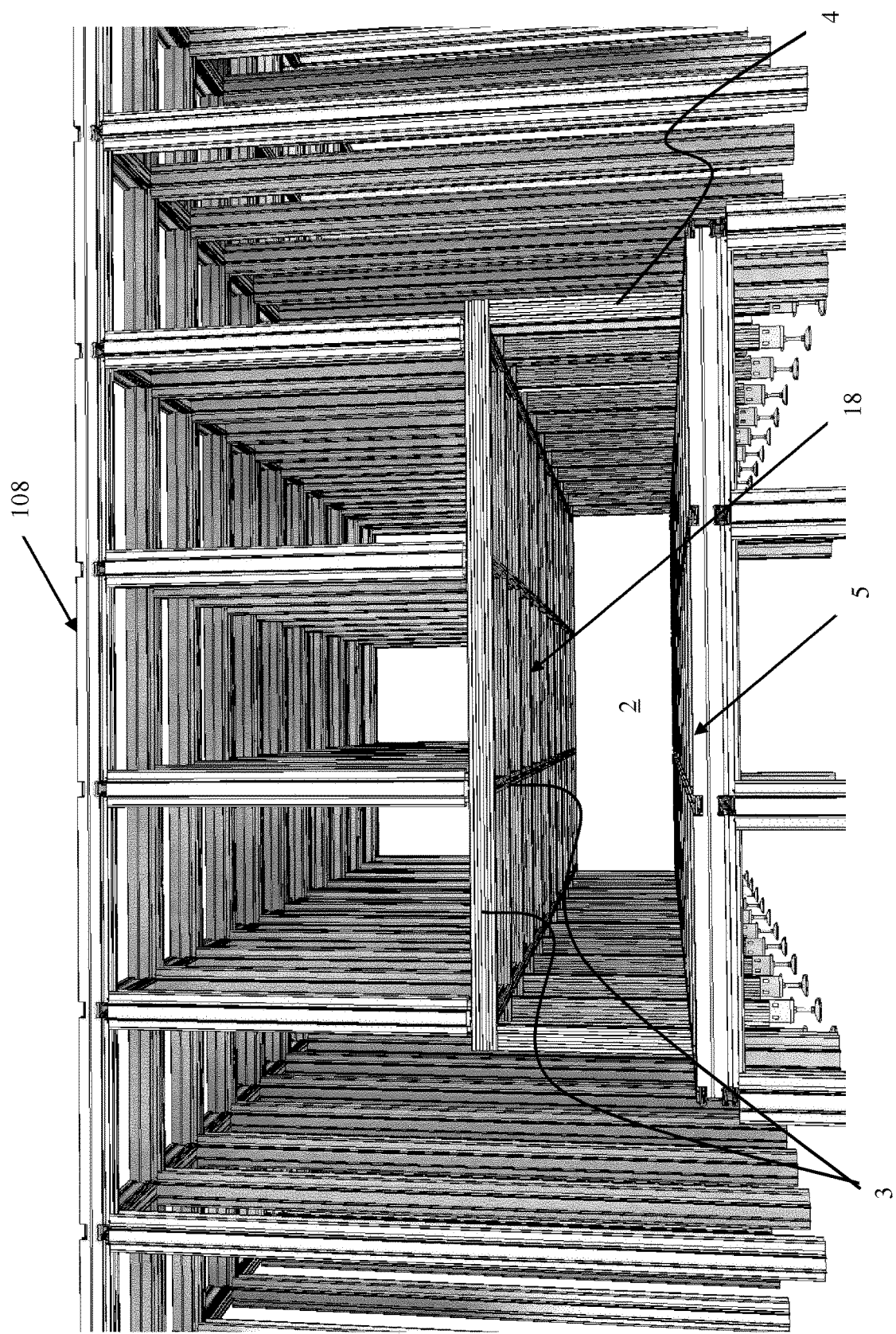
FIG. 4 is a perspective side view of the storage grid in FIG. 3.
Figure 5:
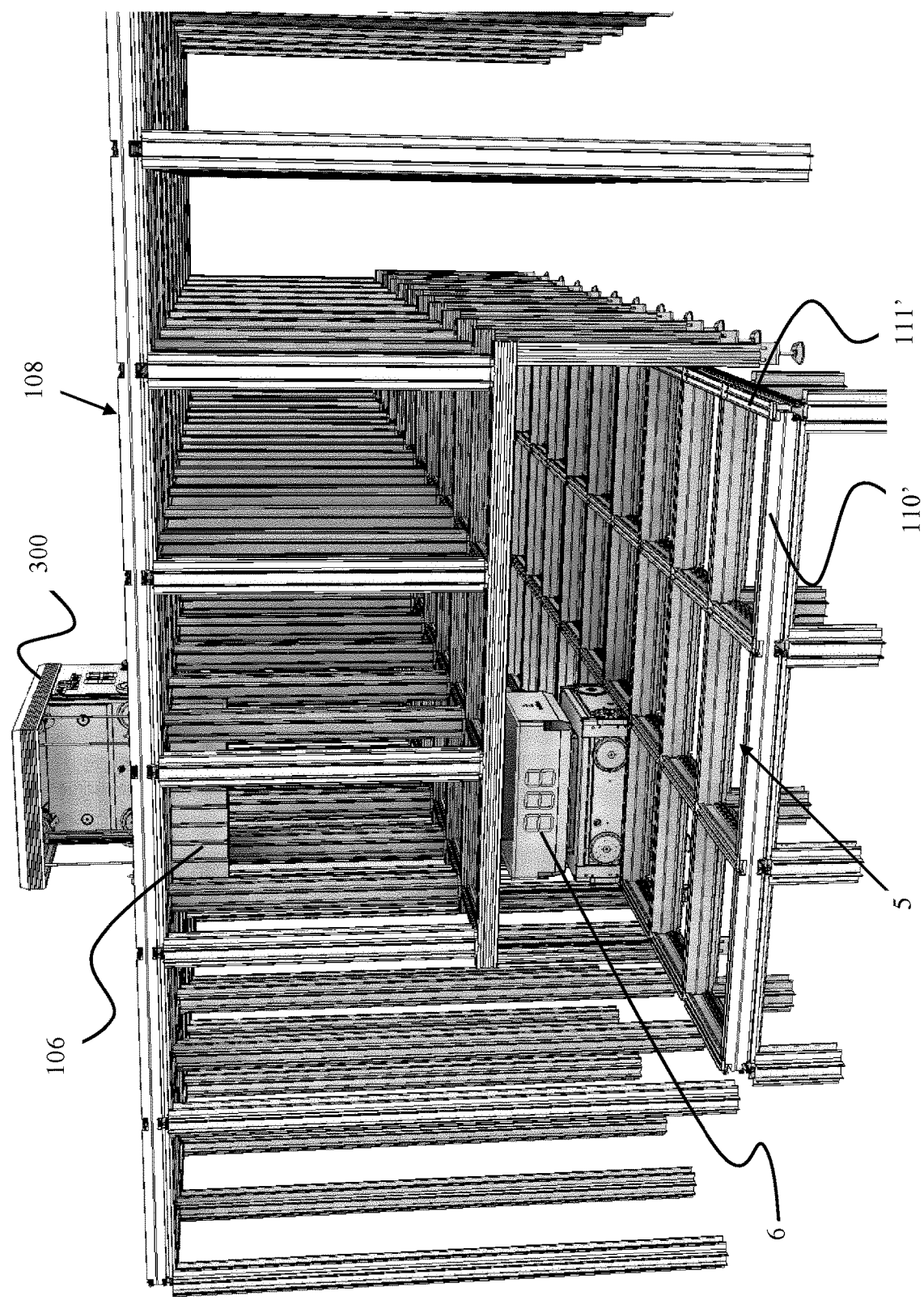
FIG. 5 is a perspective view of the storage grid in FIGS. 3 and 4, featuring a container-handling vehicle and a container transfer vehicle.

An embodiment of a storage grid for an automated storage and retrieval system according to the invention is shown in FIGS. 3 and 4 and the same storage grid featuring a container-handling vehicle 300 and a container transfer vehicle 6 is shown in FIG. 5. The number of storage columns of the grid is scaled down to better illustrate the inventive features of the storage grid. The major part of the storage grid is constructed in the same manner as in the prior art systems shown in FIGS. 1A and 2A. That is, the storage grid structure 104 comprises vertical column profiles 102 defining multiple storage columns 105, in which storage containers 106 can be stored one on top of another in vertical stacks 107. The column profiles 102 are interconnected at their top ends by top rails 110,111 forming a horizontal rail grid 108

(hereinafter termed the top rail grid) upon which container-handling vehicles 200,300 may move in two perpendicular directions.

In addition to the storage columns 105, the storage grid structure of the inventive storage system comprises multiple transfer columns 119,120 through which storage containers may be transferred between the top rail grid 108 (i.e. the top level of the grid) and a transfer section 2 (or tunnel/passageway) extending within the storage grid structure at a level below the top rail grid. The transfer section extends from an opening in an external side of the grid structure 104 and below the multiple transfer columns 119,120. In an advantageous embodiment, especially in connection with large storage grids, the transfer section may extend to a substantially central position of the storage grid, and even pass all the way through the storage grid via a substantially central section of the storage grid structure 104, to reduce the distance a storage handling vehicle 200,300 must travel to reach a transfer column.

The transfer section 2 is defined or constructed by multiple horizontal ceiling profiles 3, vertical support profiles 4 and a section of a horizontal rail grid 5 (hereinafter termed a transfer rail grid). The ceiling profiles 3 providing a horizontal support grid 18. The height H of the transfer section 2 may be defined by the distance between a lowermost surface of a ceiling profile 3 and an upper surface of an opposing rail 110', 111' of the transfer rail grid 5, and the width W of the transfer section is defined by the distance between an inner surface of two support profiles 4 connected to a common ceiling profile 3. The multiple transfer columns 119,120 are defined by vertical column profiles extending from the top rail grid to the ceiling profiles 3. The height H of the transfer section 2 is sufficient to allow a container transfer vehicle 6 to travel within the transfer section 2 when carrying a storage container.

The ceiling profiles 3, and/or the support grid 18, are supported by the vertical support profiles 4 arranged at the periphery of the transfer section 2.

FIG. 5 shows a situation in which a storage container 106 is being transferred between a container transfer vehicle 6 and a container-handling vehicle 300.

Figure 14B:
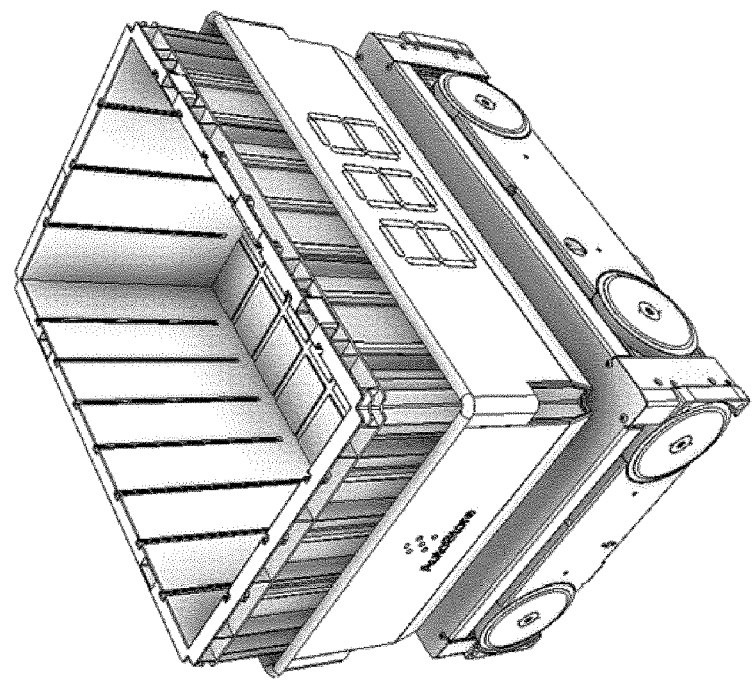
FIGS. 14A and 14B are perspective views of an exemplary container transfer vehicle according to the invention.
Figure 14A:
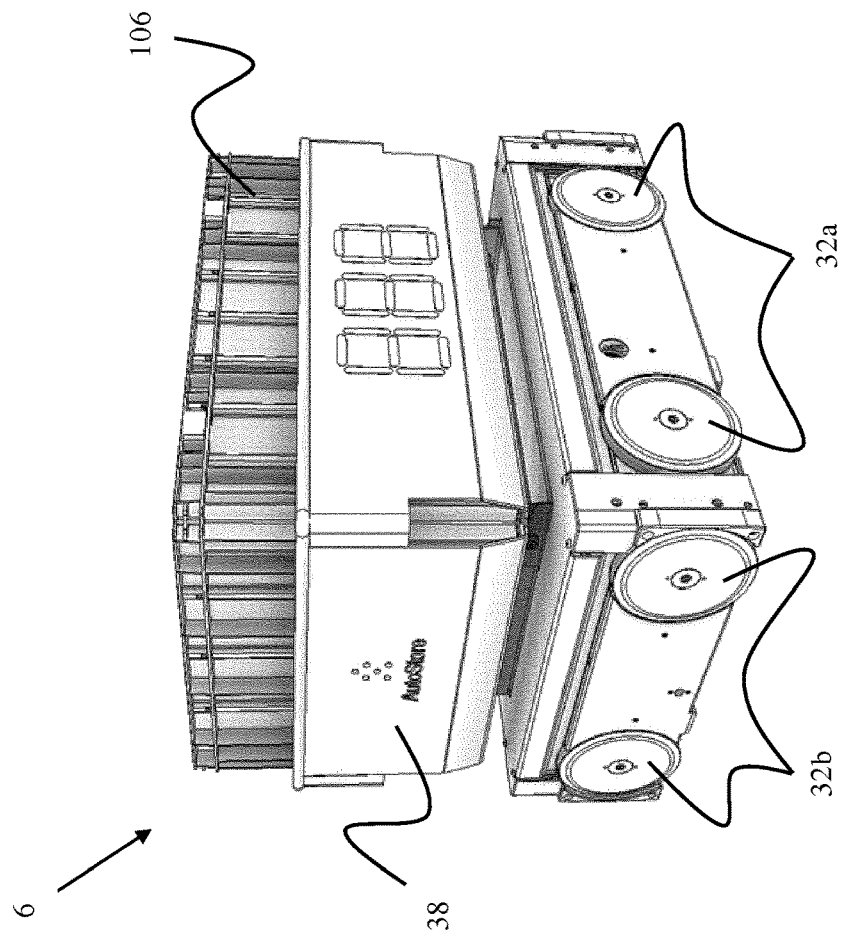

The transfer rail grid 5 in the transfer section 2 comprises rails 110',111' (i.e. transfer rails), similar to the rails 110,111 (i.e. top rails) of the top rail grid 108, upon which a container transfer vehicle 6 (or delivery vehicle) may move in two perpendicular directions. The container transfer vehicle 6, see FIGS. 14A and 14B for an embodiment of a suitable transfer vehicle, features a wheel arrangement 32a, 32b allowing the vehicle to travel upon the transfer rail grid 5 and a container carrier 38 for accommodating a storage container to be transferred. The disclosed container transfer vehicle 6 features a container carrier 38 in the form of a deep tray, in which a lower portion of a storage container 106 may be accommodated. However, numerous alternative solutions for suitable container carriers are envisaged and the main functional feature of all suitable containers carriers is the ability to receive a storage container being lowered on top of the container carrier and retain the storage container during movement of the container transfer vehicle upon the transfer rail grid 5. Further, the horizontal periphery of the container transfer vehicle 6 is preferably such that each of the multiple adjacent transfer columns 119,120 may be used to transfer a storage container 106 to a respective container transfer vehicle 6 simultaneously. To obtain the latter function, the horizontal periphery of the container transfer vehicle 6 fits within the horizontal area defined by one of the grid cells 122' of the transfer rail grid 5. Further, the transfer rails 110',111' extending in one of the two perpendicular directions are dual-track rails, see below, to allow multiple container transfer vehicles to be arranged adjacently below the multiple adjacent transfer columns 119,120.

In the arrangement shown, the transfer section 2 has a width W providing room for three separate transfer vehicle paths 7, 7', 7" in a longitudinal direction of the transfer section. By having three separate transfer vehicle paths, three transfer vehicles 6 may pass each other at the same time. To allow this feature, at least the rails 111' extending in the longitudinal direction of the transfer section are dual-track rails. Suitable dual-track rails are disclosed in for example WO 2015/193278 A1 and WO 2015/140216 A1. A dual-track rail 110',111' comprises two parallel tracks. In other words, three parallel dual-track rails may provide two parallel transfer vehicle paths. The rails 110' arranged in a perpendicular direction relative the rails 111' extending in the longitudinal direction of the transfer section may be single-track rails or dual-track rails. In particular, when the storage grid structure 104 comprises multiple adjacent transfer columns 119,120, it may be advantageous that all rails 110',111' in the transfer rail grid 5 are dual-track rail as it provides an optimum flexibility for movement of the container transfer vehicles 6 to/from the positions below the transfer columns 119,120. The design of the transfer rails 110',111' and the wheel arrangement 32a,32b of the container transfer vehicles 6 allows the vehicles to change tracks when needed, i.e. the container transfer vehicle 6 may move in two perpendicular directions upon the transfer rail grid 5. The wheel arrangement may preferably be similar to the ones described for the prior art container-handling vehicles 200,300.

Depending on the requirements of the inventive storage system (i.e. the size of the storage grid, turnover of storage containers etc.) one or more of the transfer vehicle paths 7, 7', 7" are arranged below an optional number of transfer columns 119,120.

Figure 6:
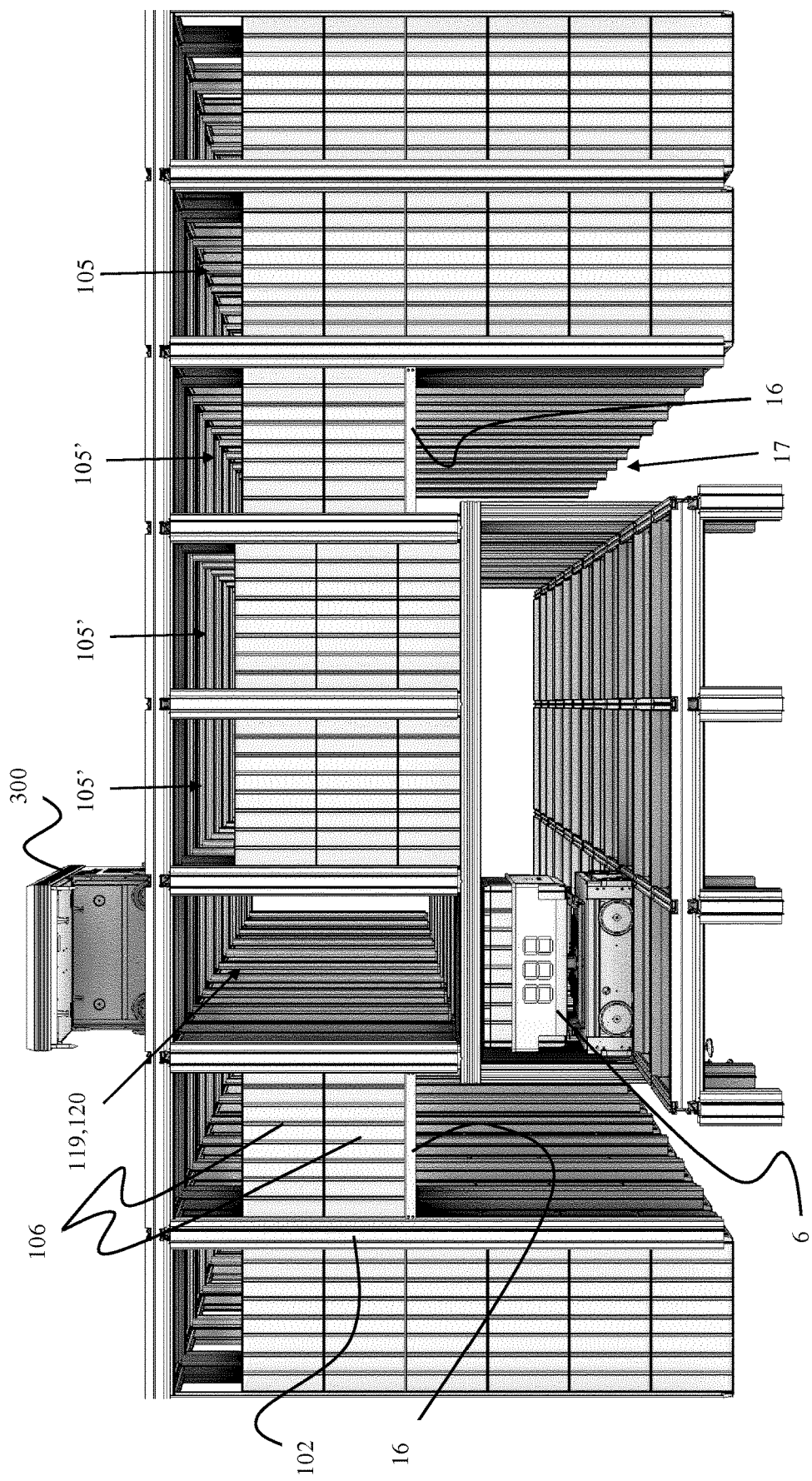
FIG. 6 is a perspective view of the storage grid in FIGS. 3 to 5, wherein the storage columns are stocked with storage containers.
Figure 12:
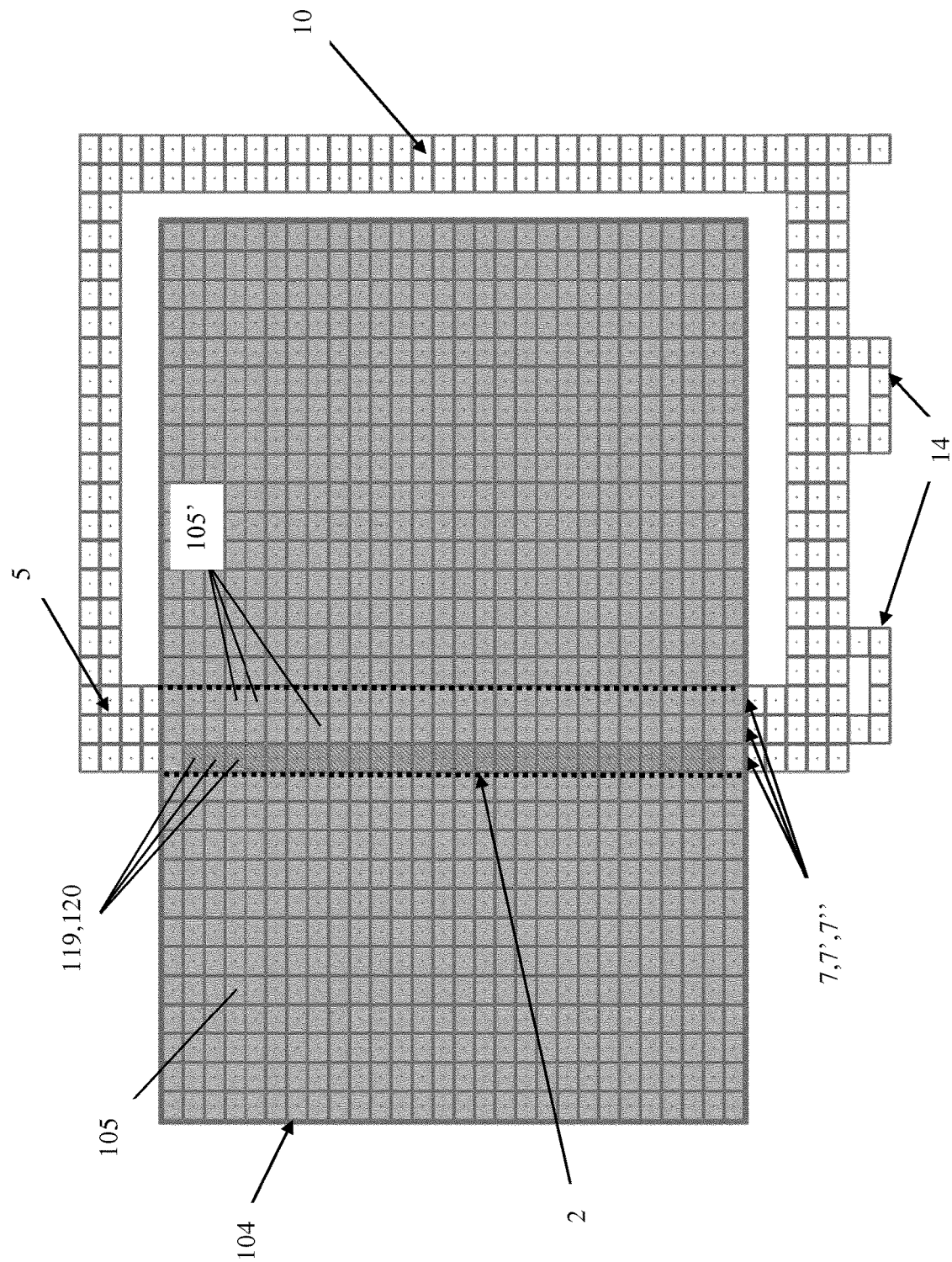
FIG. 12 is a detailed view of a section of the storage system in FIG. 11.

The grid columns 112 arranged above the transfer section and not designated as transfer columns may be used as storage columns 105' (see FIGS. 6 and 12). This is achieved by adding stopper elements 16 (e.g. brackets fastened to the relevant column profiles) at the lower end of the respective grid columns 102 (the stopper elements in the storage columns 105' arranged above the transfer section 2 is not visible in the drawings). The stopper elements 16 are designed to support a storage container 106 being lowered into the respective grid column 112 and prevent it from entering the transfer section 2 below. In this manner a minimum of potential storage space is lost from the storage grid structure 104 due to the transfer section 2. The stopper elements 16 may also be used to provide an operator passage 17 below a row of storage columns 105' adjacent to the transfer section 2. In this manner, an operator or service person may access a container transfer vehicle 6, for instance in case of a failure preventing the vehicle from exiting the transfer section.

The transfer rail grid 5 extends out of the storage grid structure 104 and depending on the design and extent of the transfer rail grid 5, the container transfer vehicles 6 may be used to transfer storage containers 106 between multiple separate storage grid structures, transfer containers from a storage grid to a picking/stocking stations, transfer to dedicated stocking zones, transfer to an assembly line for delivery of parts, etc.

Figure 7:
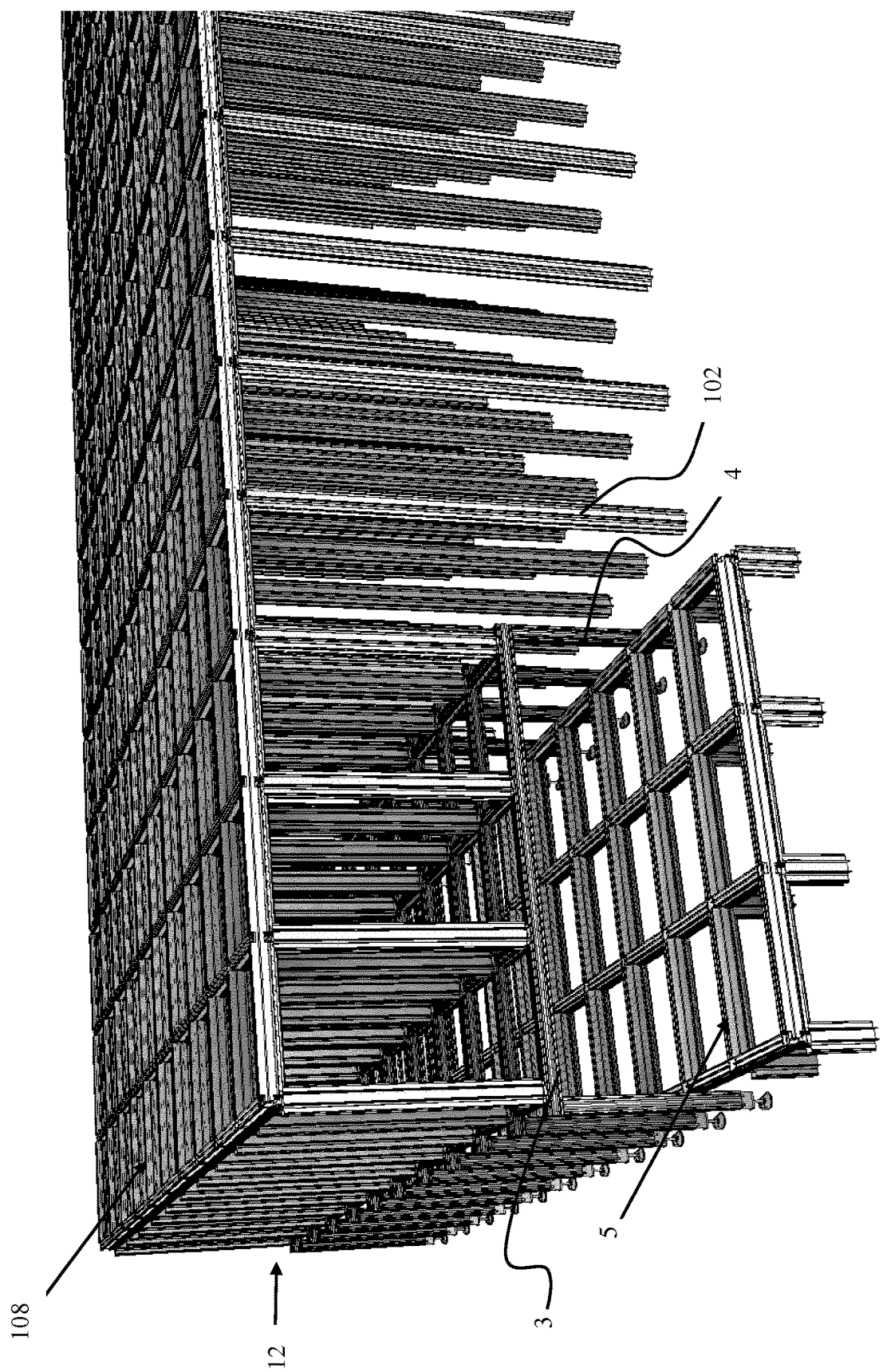
FIG. 7 is a perspective view of a second exemplary storage grid for use in a storage system according to the invention.
Figure 8:
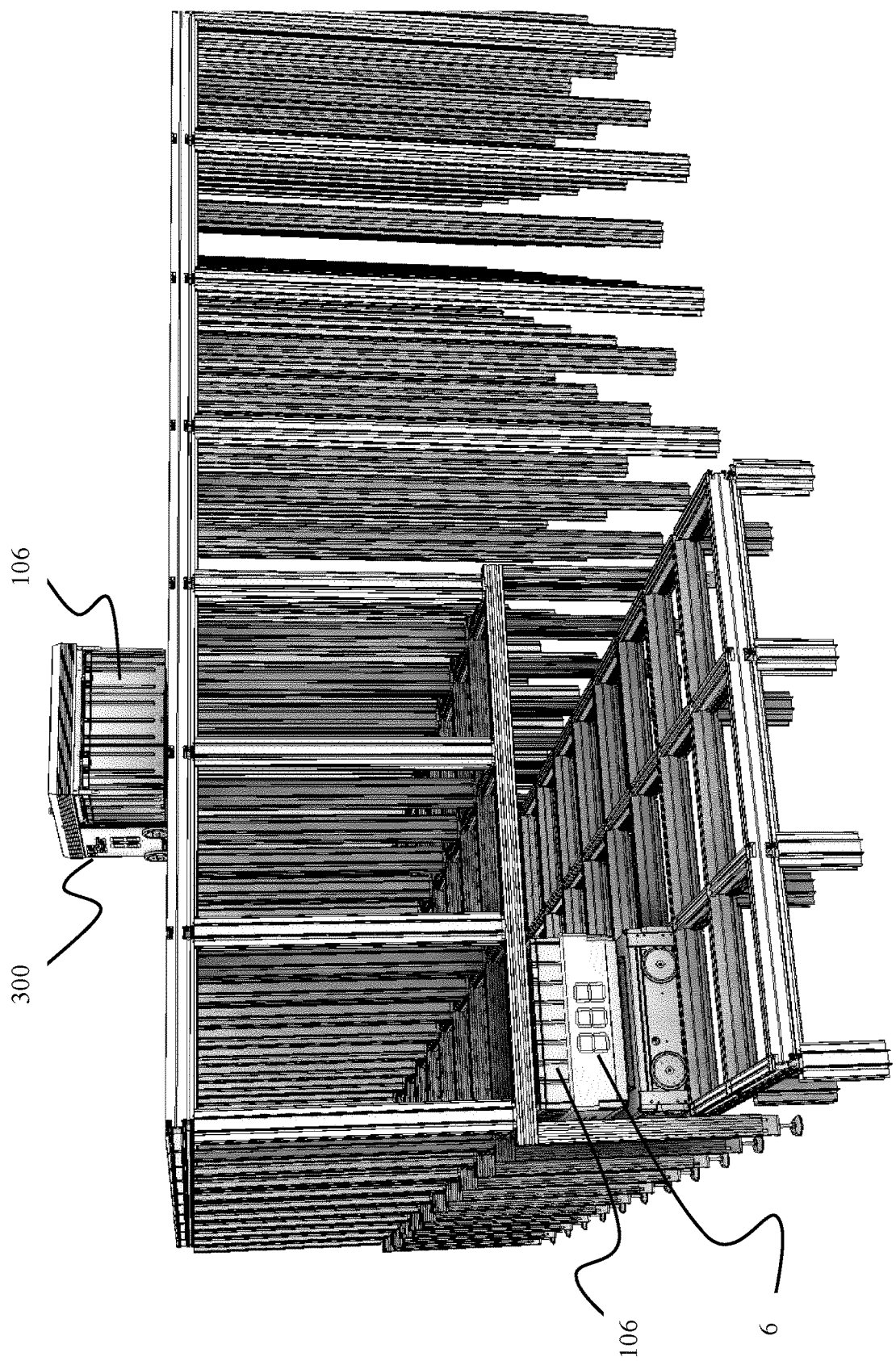
FIG. 8 is a perspective view of the storage grid in FIG. 6, featuring a container-handling vehicle and a container transfer vehicle.

A second embodiment of the storage grid 104 for an automated storage and retrieval system according to the invention is shown in FIGS. 7 and 8. In this embodiment, the differentiating feature in view of the embodiment discussed above is that the transfer section 2 is arranged along or adjacent an external side section 12 of the storage grid 104.

Figure 9:
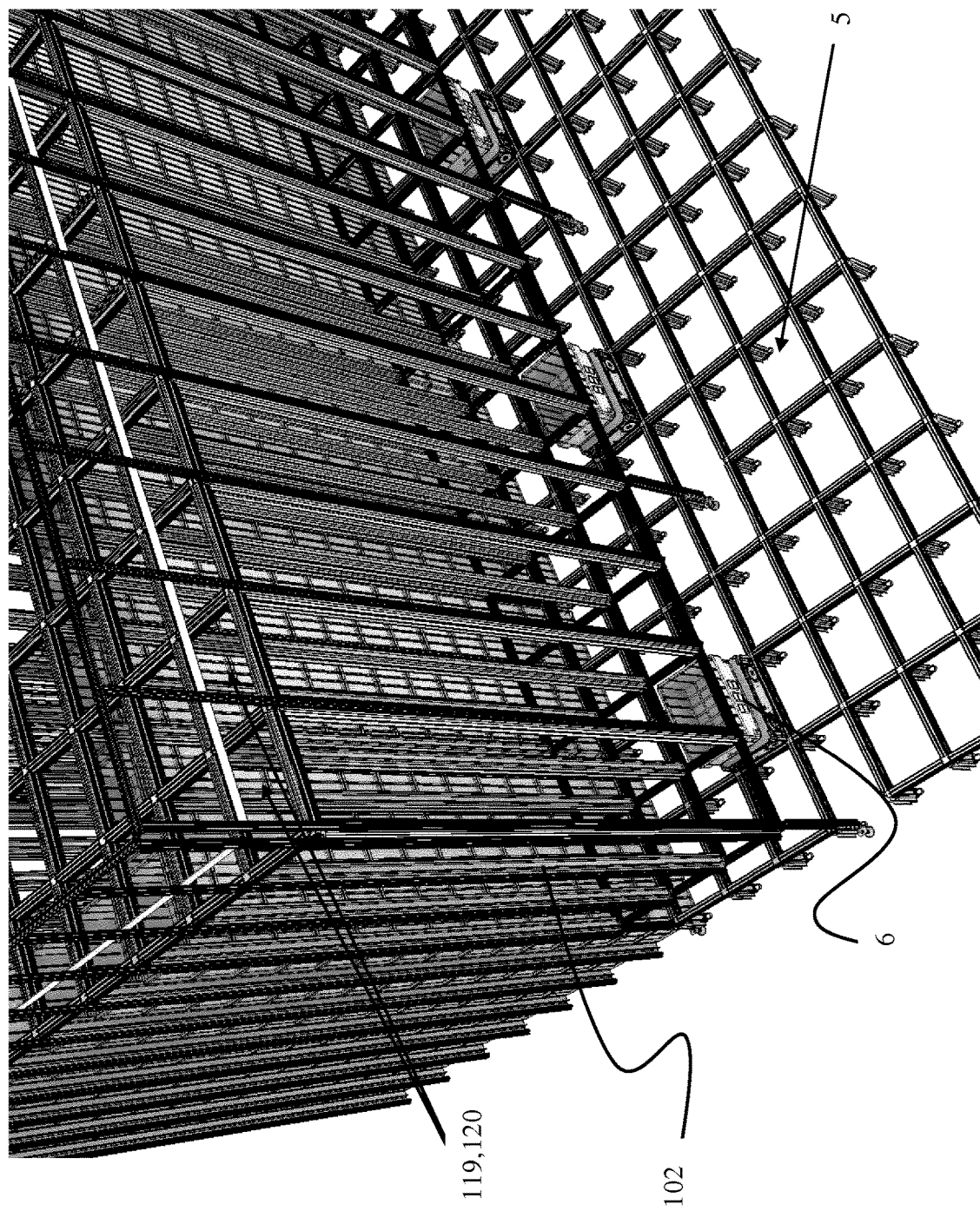
FIG. 9 is a perspective top view of a third exemplary storage grid for use in a storage system according to the invention.
Figure 10:
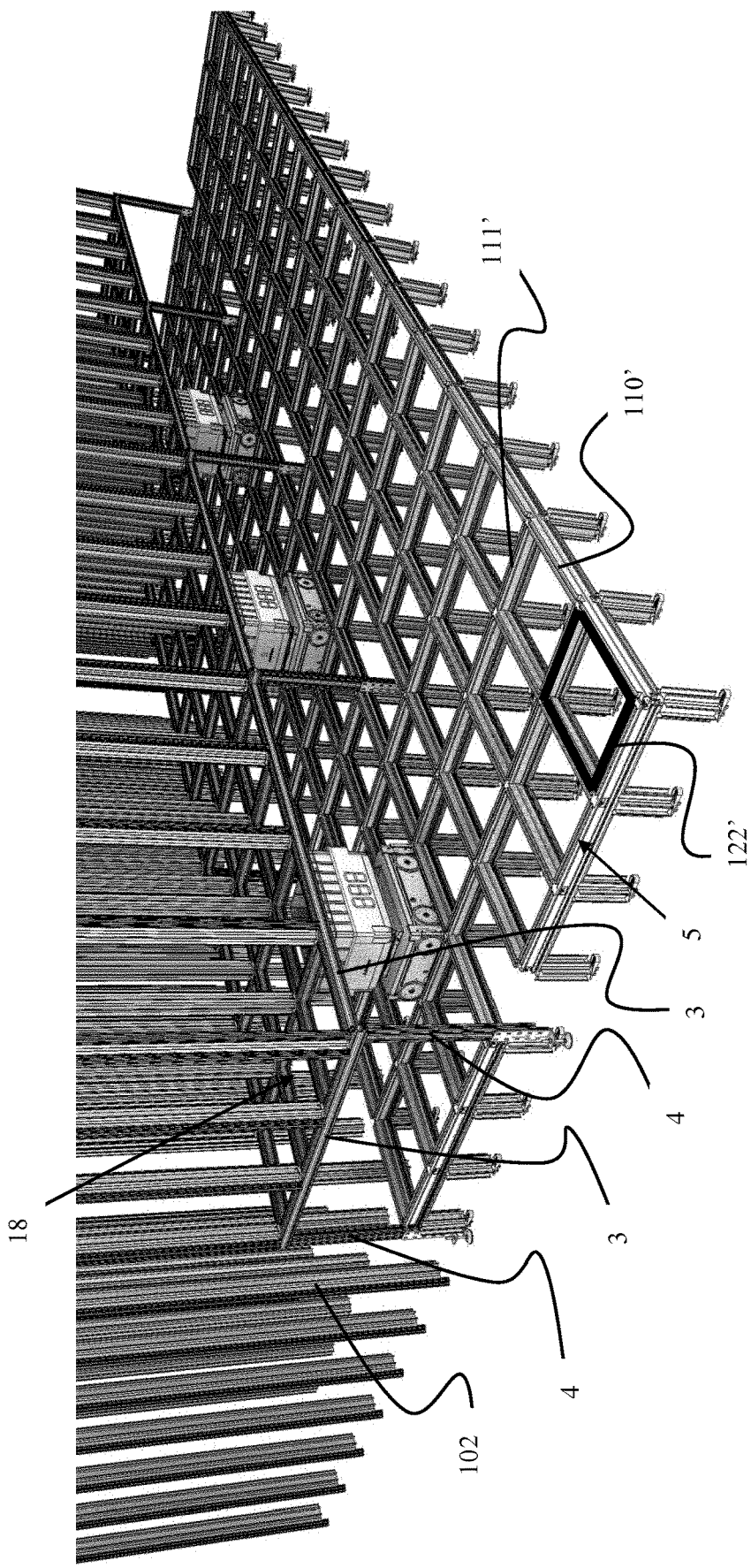
FIG. 10 is a perspective side view of a third exemplary storage grid for use in a storage system according to the invention.

A third embodiment of the storage grid 104 for an automated storage and retrieval system according to the invention is shown in FIGS. 9 and 10. The main differentiating feature of the third embodiment in view of the embodiments discussed above is the construction of the support grid 18 allowing the container transfer vehicles to exit/enter the transfer section via the longitudinal side of the transfer section.

The preferred arrangement and size of the transfer section 2 in any given storage system, as well as the positioning of the transfer columns 119,120, will depend on the size of the storage grid structure 104, the intended use of the storage system 1, the available space in which the storage system is arranged, the shape/layout of said space, etc. Independent of the specific positioning of the transfer section 2 within the storage grid structure, the storage system according to the invention will provide a number of advantages in view of the prior art storage systems, as disclosed throughout the present specification.

Figure 11:
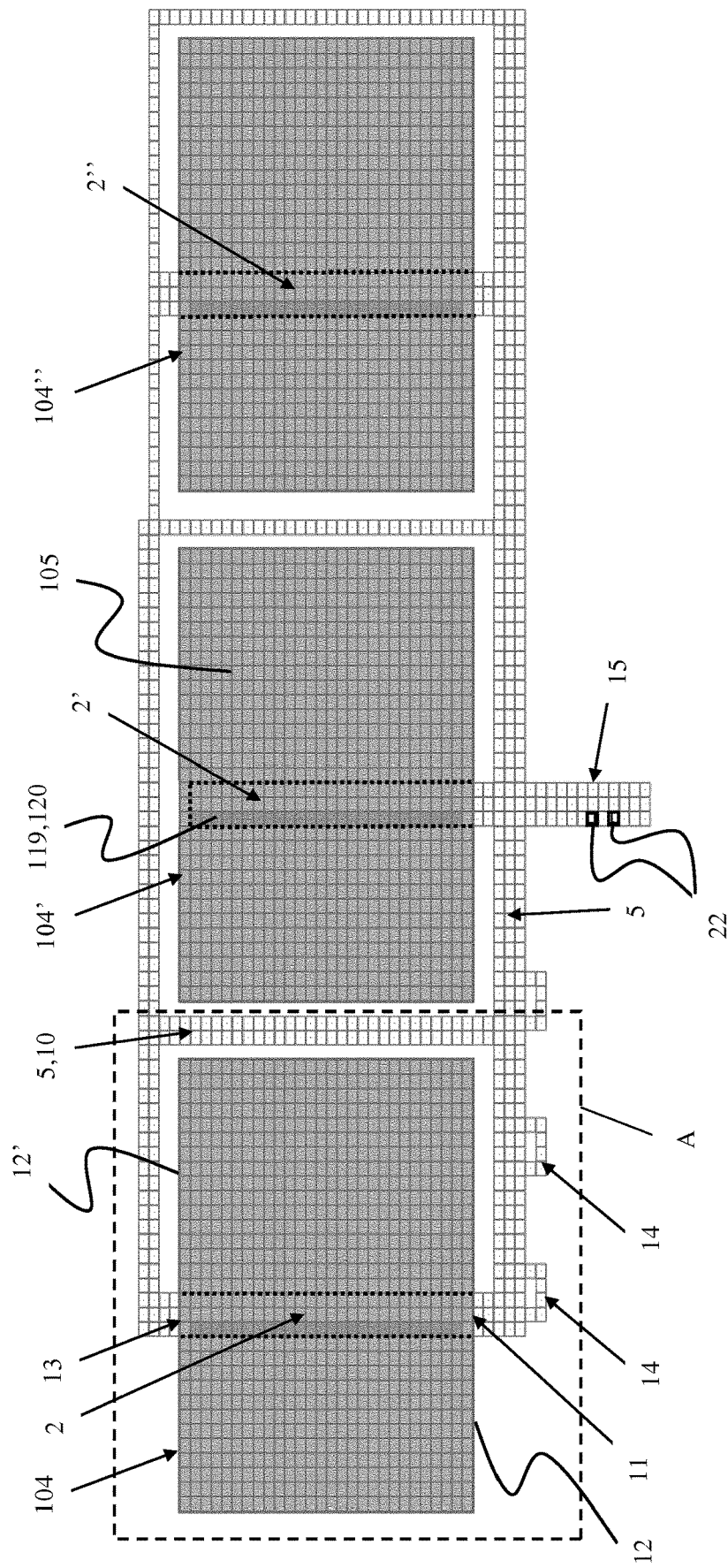
FIG. 11 is a schematic top view of an exemplary storage system according to the invention.

A schematic overview of an exemplary layout of an inventive storage system 1 is shown in FIGS. 11 and 12. The exemplary layout illustrates some of the many advantages of the inventive storage system.

The storage system in FIG. 11 comprises three separate storage grid structures 104, 104', 104". Each of the first and the third storage grid structures 104,104" features a transfer section 2,2" extending through the whole respective storage grid structure, i.e. the transfer sections extend from a first opening 11 in an external side 12 of the storage grid to a second opening 13 in an opposite external side 12'. In this manner, a container transfer vehicle 6 having received or delivered a storage container 106 via any of the multiple transfer columns 119,120 may exit the first 11 or the second opening 13 of the transfer section 2 depending on which pathway to a selected destination is most efficient.

Each of the transfer sections 2,2',2" features three transfer vehicle paths 7, 7', 7", see FIG. 9. The first vehicle path 7 is arranged below multiple adjacent transfer columns 119,120, through which storage containers 106 may be transferred between the top rail grid 108 and a container transfer vehicle 6. The second and third vehicle paths 7',7" are arranged below multiple storage columns 105' and are predominantly used by the container transfer vehicles 6 to travel within the transfer section to or from a transfer column 119,120. The transfer section 2' in the second storage grid 104' does not extend all the way through the storage grid, and a container transfer vehicle 6 will always enter and exit the transfer section via the first opening.

Figure 13:
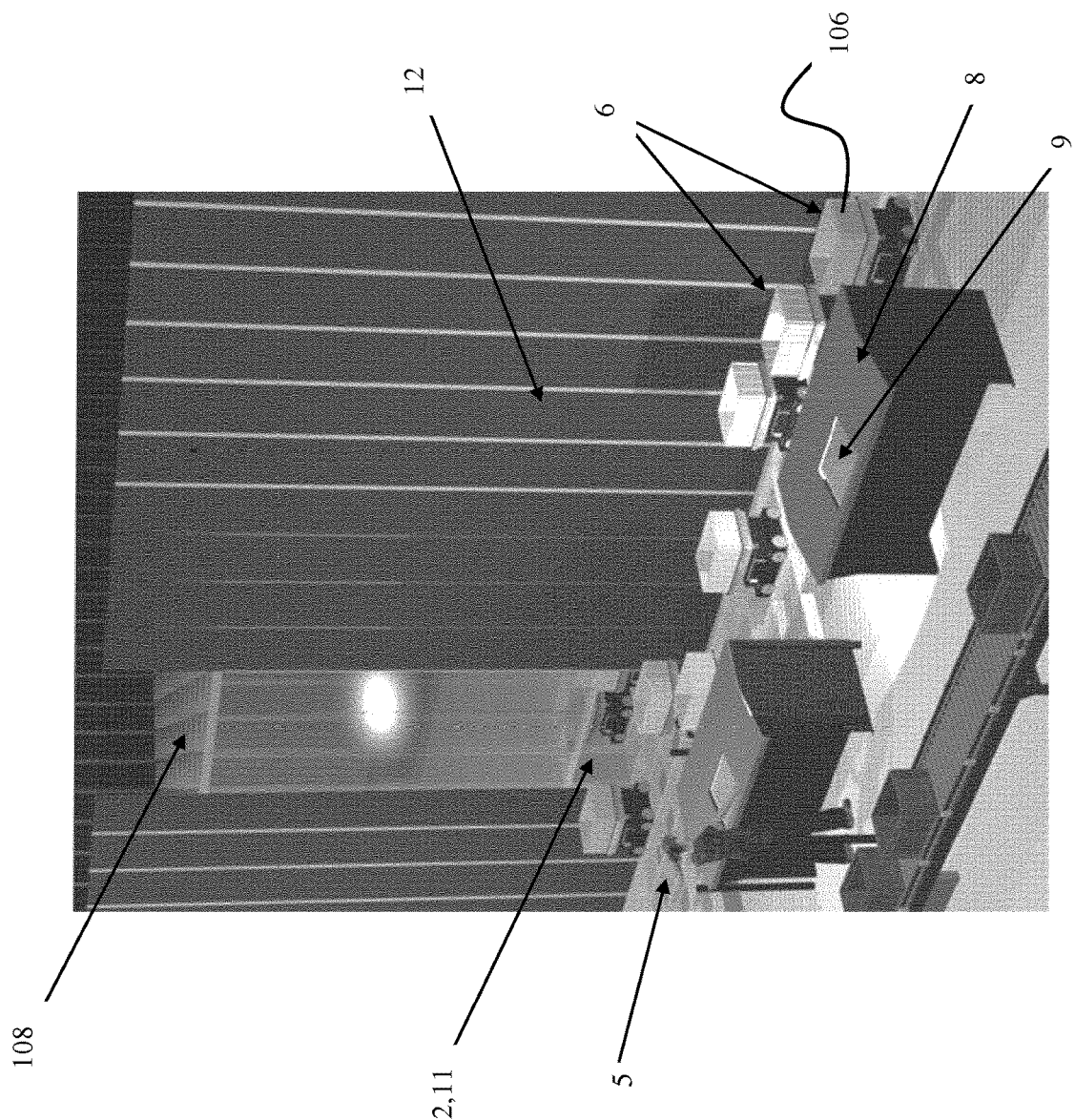
FIG. 13 is a perspective view of a storage system according to the invention.

The transfer grid 5 interconnects the transfer columns 119,120 of the first storage grid 104 with transfer columns 119,120 of the second and third storage grid 104', 104", with rail loops/circuits 14 (that may for instance be arranged at a picking/stocking station, see FIG. 13), with a multi-use transfer grid area 15 and any other destination to which the transfer of a storage container is desired. The multi-use transfer grid area 15 may for instance be used for stocking large amounts of new items to the storage grid, as temporary parking for transfer vehicles carrying storage containers comprising high-demand items, and/or as a loading area for storage containers to enter the storage grids.

In the exemplary layout in FIG. 11, the multi-use transfer grid area 15 comprises two charging stations 22 for charging the batteries of the container transfer vehicles 6. The type of charging station(s) used for the container transfer vehicles 6 and the container-handling vehicles 200,300 will depend on the specific charging system used. A description of an inventive charging system suitable for the container transfer vehicles 6, and the prior art container-handling vehicles 300 having a cantilever construction, is described below by reference to FIGS. 15-25.

Use of an area or section of the transfer grid 5 to accommodate container transfer vehicles 6 carrying storage containers 106 comprising high-demand items, i.e. a parking section of the transfer grid, provides for a highly efficient method of retrieving items that have a very high picking rate, i.e. that have a particularly high turnover. In prior art systems such high turnover items entail that the specific storage container(s) in which these items are stored is transferred back and forth between a storage column 105 and a picking/stocking station more or less continuously. In the inventive storage system, items having a particularly high turnover may permanently (or at least intermediately) be stored in a storage container arranged on a transfer vehicle 6. In this manner, high turnover items may be accessed in a very short time, crowding at the transfer columns are further minimized and unnecessary use of the container-handling vehicles 200,300 are avoided.

The schematic overview in FIG. 12 shows details of the first storage grid 104 in FIG. 11 but may also illustrate an alternative layout of a storage system comprising a single storage grid 104.

FIG. 13 discloses an embodiment of an inventive storage system having a layout substantially as shown in FIG. 12. The storage system features two picking/stocking stations 8, wherein each is arranged such that a container transfer vehicle 6 may pass beneath a container access opening 9 arranged in the picking/stocking station while moving on the transfer rail grid 5. In other words, the picking/stocking stations 8 are arranged such that a container transfer vehicle 6 may pass through the picking/stocking station via rail loops 14 as shown in FIGS. 11 and 12. Thus, a storage container 106 containing an item to be picked (or a storage container into which an item is to be stocked) is first retrieved by a container-handling vehicle 200,300 arranged on the top rail grid 108, lowered to a container transfer vehicle 6 positioned inside the transfer section 2 beneath a suitable transfer column 119,120, and transported by the container transfer vehicle 6 to a picking/stocking station 8, wherein the transfer vehicle stops at a position beneath the container access opening 9 to allow an operator to pick the item.

The storage system 1 shown in FIGS. 11 and 12, features three laterally separated storage grid structures 104, 104', 104" arranged at the same level. However, it is also envisioned that the storage system according to the invention may comprise storage grid structures separated in a vertical direction, e.g. stacked on top of each other. When separated in the vertical direction, the transfer rail grid of the storage system may for instance comprise a container transfer vehicle lift for lifting a container transfer vehicle between separate levels of the transfer rail grid, such that a container transfer vehicle may access all areas of the transfer grid.

In the disclosed embodiments of the invention, the transfer section 2 comprises a section of the transfer rail grid 5 featuring three parallel vehicle paths 7,7',7" allowing three transfer vehicles 6 to pass each other at the same time. However, many of the advantages of the present inventive storage system may also be obtained by use of a transfer section 2 comprising at least one vehicle path provided the track is arranged below at least one transfer column 119,120.

In the disclosed embodiments of the invention, the transfer rails 110',111' of the transfer rail grid 5 are dual-track rails identical to the rails 110,111 of the top rail grid. This feature is advantageous in a cost perspective since the number of different parts used in constructing the storage grid structure 104 is minimized.

Further, it allows for the use of transfer vehicles 6 having a wheel arrangement similar to the one used in the container-handling vehicles 200,300, a feature which significantly simplifies the overall system cost. However, the main advantages of the inventive storage system and storage grid structure, e.g. a highly flexible and efficient transfer of storage containers in and out of the storage grid, as well as the avoidance of single point of failures disrupting the operation of the storage system, may also be obtained by embodiments of the invention, wherein the transfer rails of the transfer rail grid 5 are different from the rails of the top rail grid 108. An important feature for avoiding a single point of failure is that the container transfer vehicles may pass each other and move in two perpendicular directions upon at least the section of the transfer rail grid arranged in the transfer section. This feature allows the container transfer vehicles to pass around for instance a non-functioning container transfer vehicle which would otherwise have caused an interruption of the storage system operation. The presence of multiple transfer columns may further minimize any risk of a single point of failure disrupting the operation of the storage system.

It is noted that the dimensions of the grid cells 122 (see prior art system in FIGS. 1A and 2A and the relevant prior art description) of the top rail grid 108 are preferably similar or identical to the dimensions of the grid cells 122' (see FIG. 10) of the transfer rail grid 5. Having the grid cells of similar dimensions allows for an optimum use of the inventive storage system by allowing adjacent transfer columns to be used simultaneously.

Although the use of dual-track rails 110',111' in at least one direction of the transfer rail grid 5 provides several advantages with regards to for instance space efficiency by allowing container transfer vehicles 6 to pass each other at adjacent grid cells 122', an advantageous storage system may also be obtained by having a transfer grid comprising only single-track rails. Use of single-track rails would require a slightly larger transfer grid to allow container transfer vehicles 6 passing each other, as compared to dual-track rails, since such a grid would not allow the container transfer vehicles 6 to pass each other on adjacent grid cells 122'. For instance, the dual-track transfer rails 110',111' of the transfer grid 5 disclosed in FIGS. 3 and 5 could be replaced by single-track rails. In that case, two container transfer vehicles 6 would still be able to pass each other upon the transfer grid 5, for instance by having one of the container transfer vehicles travelling on vehicle path 7 and the other on vehicle path 7".

A storage system featuring an inventive charging system, and various container transfer vehicles 6' and container handling vehicles 300',400 for use with the charging system, are disclosed in FIGS. 15-25. The container transfer vehicles and container handling vehicles may generally be termed container vehicles. The container vehicles have in common that they can transport a storage container and features a first set of wheels 32a and a second set of wheels 32b for moving the container vehicle upon a rail grid. The first set of wheels 32a is displaceable in a vertical direction between a first position, wherein the first set of wheels may move the container vehicle in a first direction X, a second position, wherein the first and the second set of wheels are in contact with the rail grid, and a third position wherein the second set of wheels 32b may move the container vehicle in a second direction Y perpendicular to the first direction. The charging system may be used in combination with any suitable rail grid, such as any of the transfer rail grid 5 and the top rail grid 108 disclosed in the storage systems in FIGS. 1-13.

Figure 15:
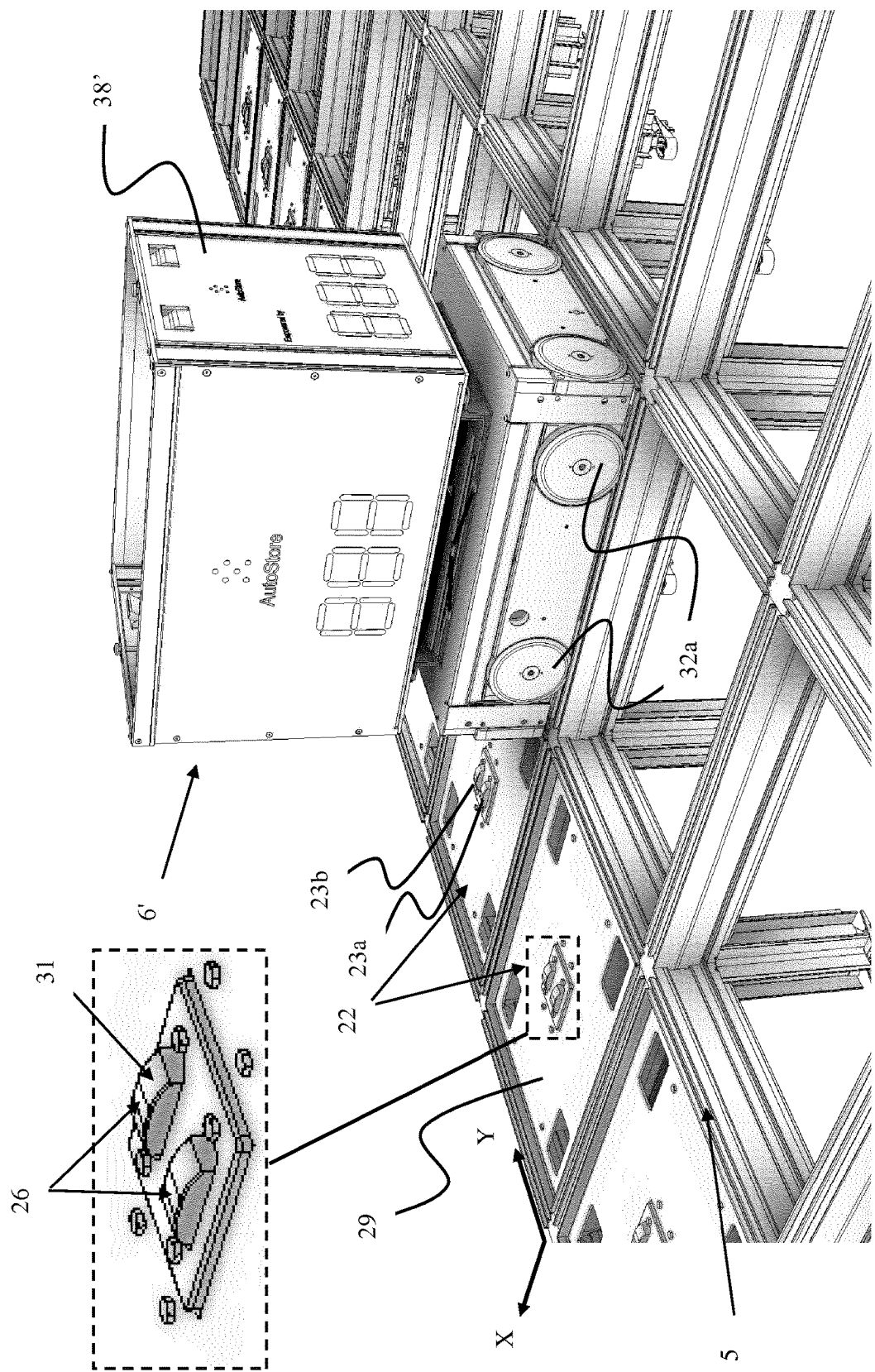
FIG. 15 is a perspective view of a storage system featuring a container transfer vehicle and a charging station according to the invention.

In FIG. 15, the charging system is arranged on a transfer rail grid 5 as described above. The container transfer vehicle 6' is similar to the container transfer vehicle 6 in FIGS. 14A and 14B, only distinguished by a slightly different container carrier 38'.

The specific charging system in FIG. 15 has a plurality of adjacent charging stations 22, each arranged within a grid cell 122' (see FIG. 10) of the transfer grid 5. In other embodiments, the charging system may have any number of charging stations 22 depending on for instance the size of the storage system and the number of container transfer vehicles 6'. Each charging station features a support structure 29, a power source charger 24 (see FIGS. 17 and 18) and two charge-providing elements 23a,23b. Each charge-providing element may comprise a flat/plane contact surface 26 (i.e. a second contact surface) facing in an upwards direction and arranged at a level above an upper level of the transfer rails 110',111' making up the transfer grid 5 (i.e. at a level above the transfer rail grid).

Figure 16:
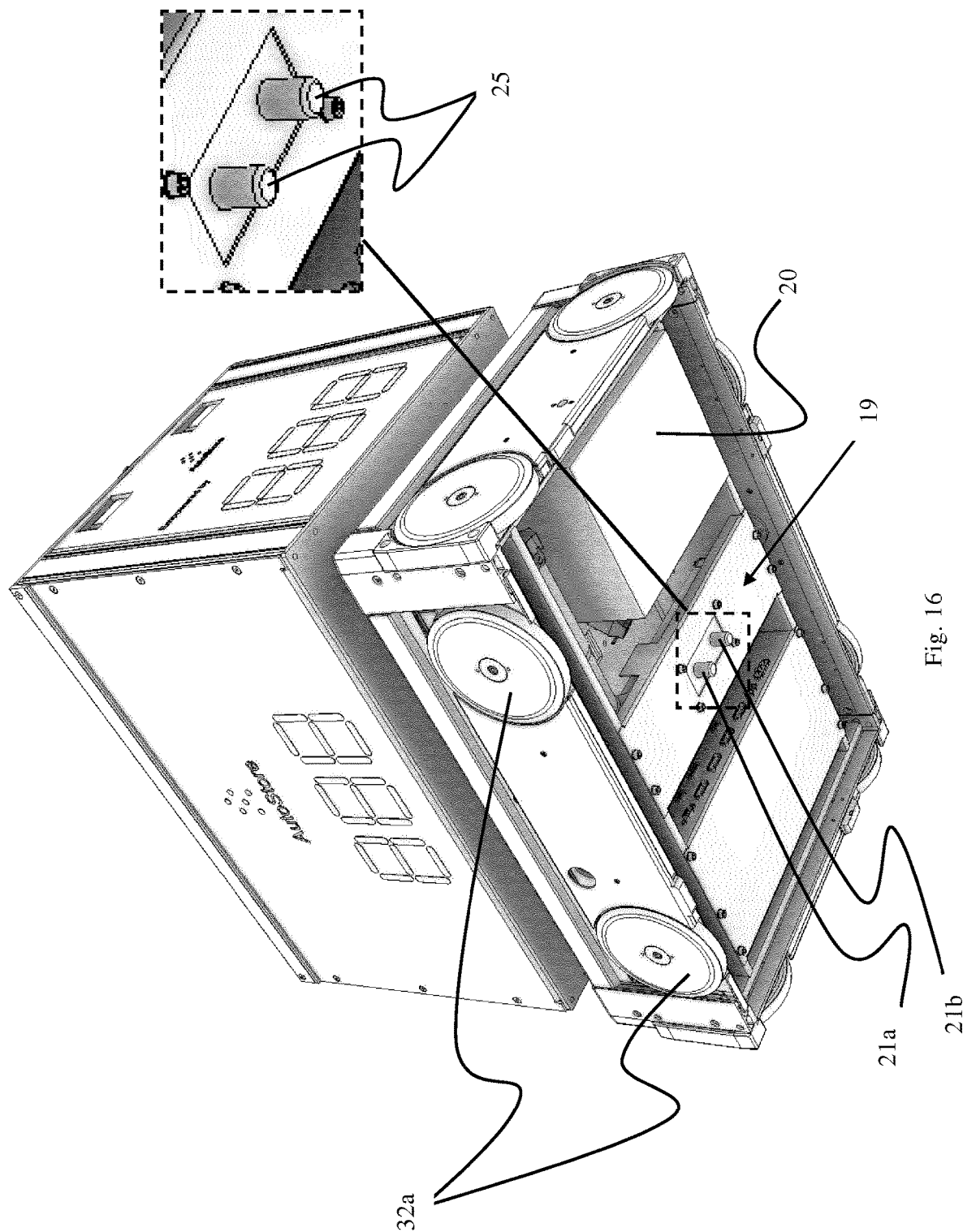
FIG. 16 is a perspective view from below of a container transfer vehicle according to the invention.
Figure 25B:
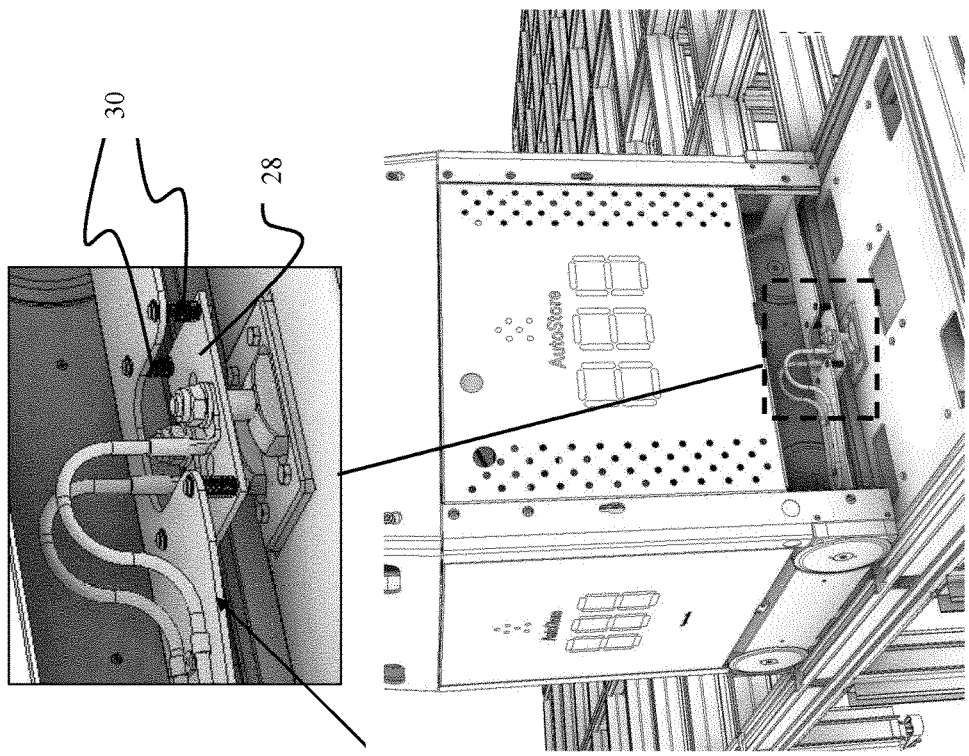
FIGS. 25A and 25B are perspective views of the container handling vehicle in FIG. 24 arranged above a charging station of a storage system.
Figure 25A:
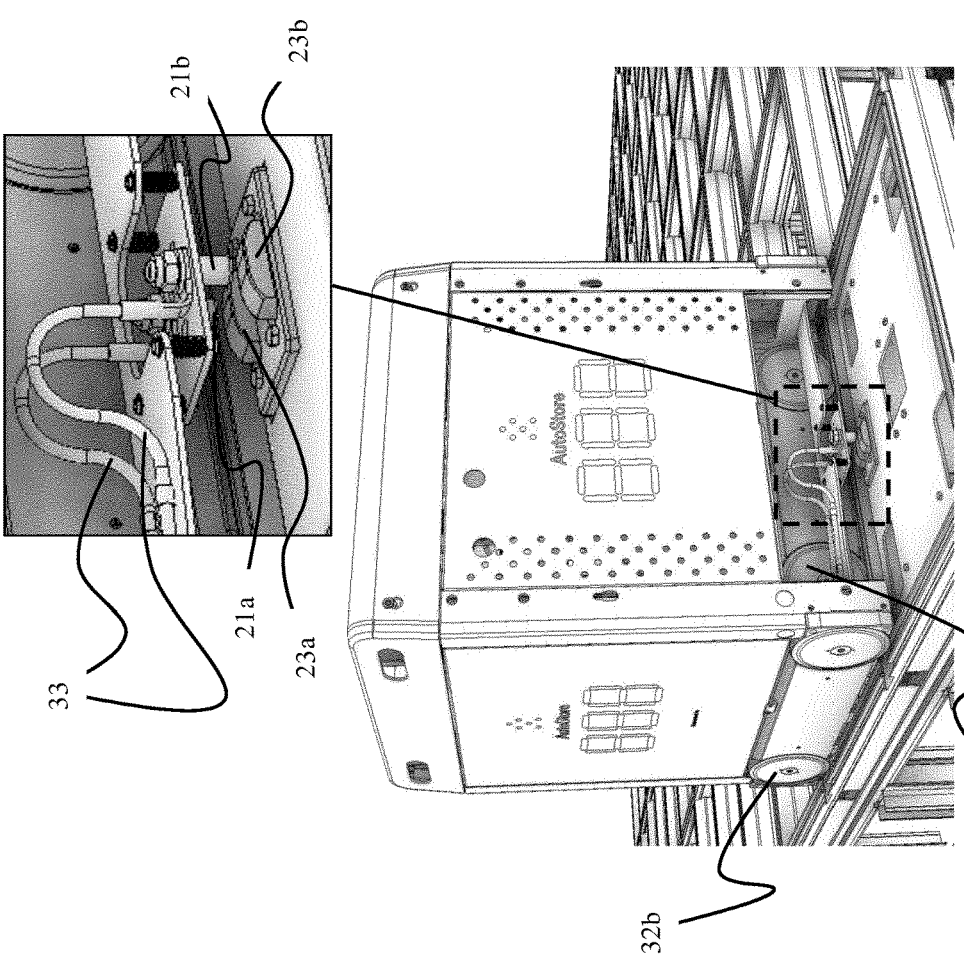

The container transfer vehicle 6', see FIG. 16, features two charge-receiving elements 21a,21b arranged at a bottom section 19 of the vehicle body and connected to a rechargeable battery 20 (i.e. a rechargeable power source) via as set of wires (not shown in FIG. 16, but similar to wires 33 in FIGS. 25A and 25B). The rechargeable battery 20 is used to drive any selected electric motor of the container transfer vehicle, e.g. wheel motors. Each charge-receiving element may comprise a flat/plane contact surface 25 (i.e. a first contact surface) facing in a downwards direction and arranged at a level above an upper level of the transfer rails making up the transfer rail grid 5 (i.e. at a level above the transfer rail grid). The charge-receiving elements 21a,21b are connected to a bottom section of the vehicle body of the container transfer vehicle by a resilient assembly (not shown, see example of a suitable resilient assembly 28,30 in FIG. 23). The charging may be controlled by a suitable control system known to the skilled person, e.g. a control system similar to the ones used in the prior art charging stations/systems. Preferably, the control system will ensure that the charge-providing elements supply required current based on the condition of the rechargeable battery. The condition may be based on at least one of voltage, temperature, state of charge, depth of discharge, state of health, coolant flow and current. The control system may in further embodiments feature at least a first signal transfer element 34a,34b,34c arranged on the container vehicle and connected to the power source, and the charging station may feature a second signal transfer element 35a,35b,35c connected to the power source charger, see FIGS. 26-28 and description below. The first and second signal transfer elements may be arranged to be in contact when the first contact surfaces are in contact with the corresponding second contact surfaces. Required signalling between the rechargeable battery 20 may also be performed by suitable wireless transfer.

The contact surfaces of the charge-providing elements and the charge-receiving elements may also be termed current-conducting surfaces since they conduct the electric current used to charge the container vehicle.

In FIG. 15, the container transfer vehicle 6' is shown entering a grid cell 122' featuring a charging station 22 by moving the container transfer vehicle 6' in the first direction X. When moving in the first direction X, the first set of wheels 32a is in the first position. When the first set of wheels 32a is in the first position, the first contact surfaces 25 are at a level above the second contact surfaces 26.

Figure 17:
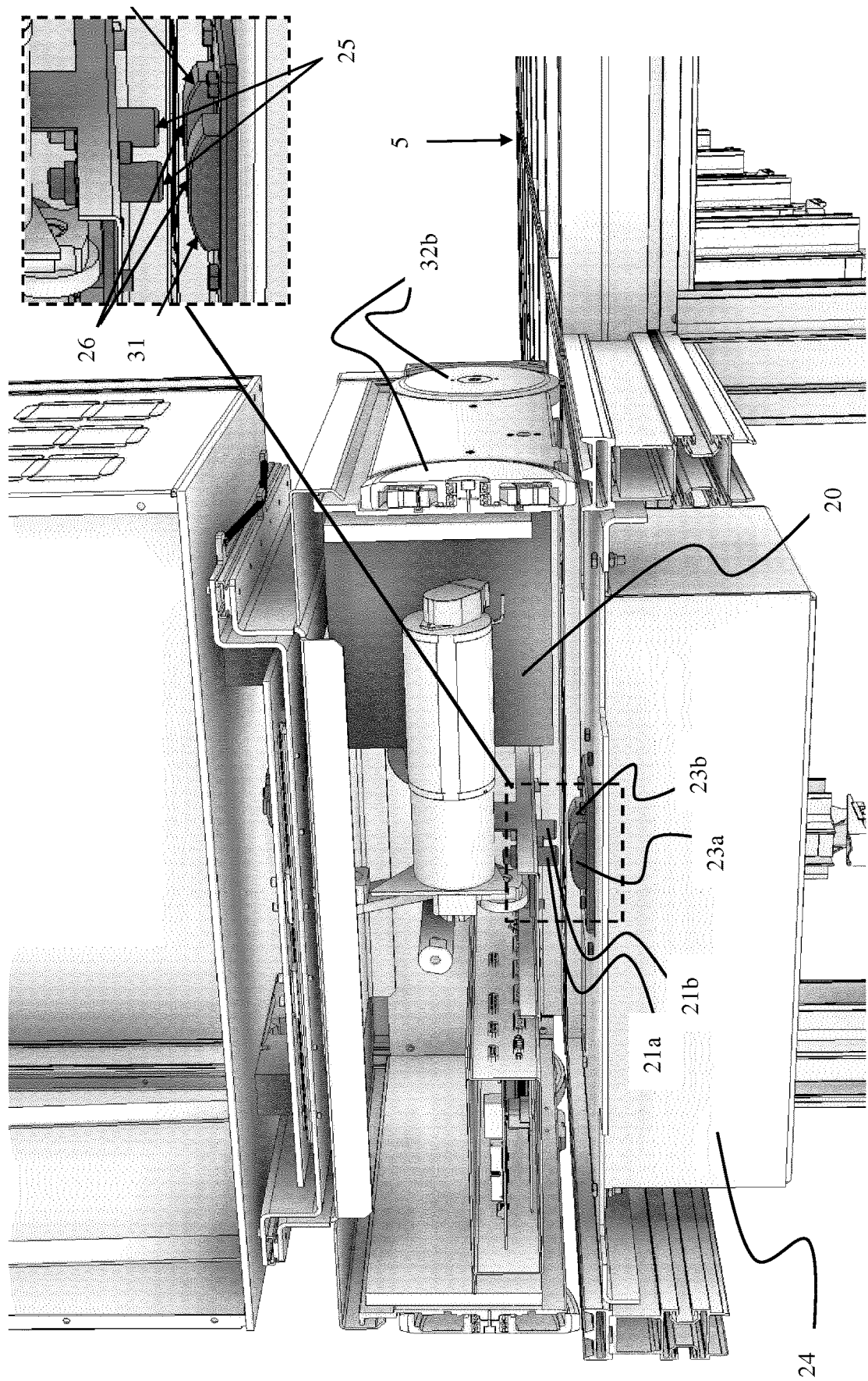
FIGS. 17 and 18 are sectional perspective views of the container transfer vehicle in FIG. 16 arranged above a charging station of a storage system.
Figure 19A:
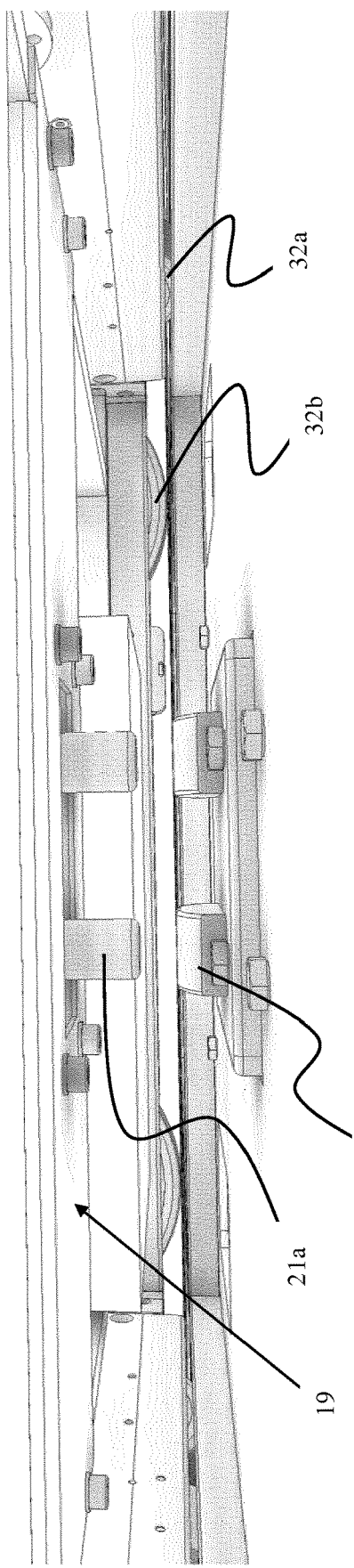
FIGS. 19A and 19B are detailed views of the interaction between the container transfer vehicle and the charging station in FIGS. 17 and 18.
Figure 19B:
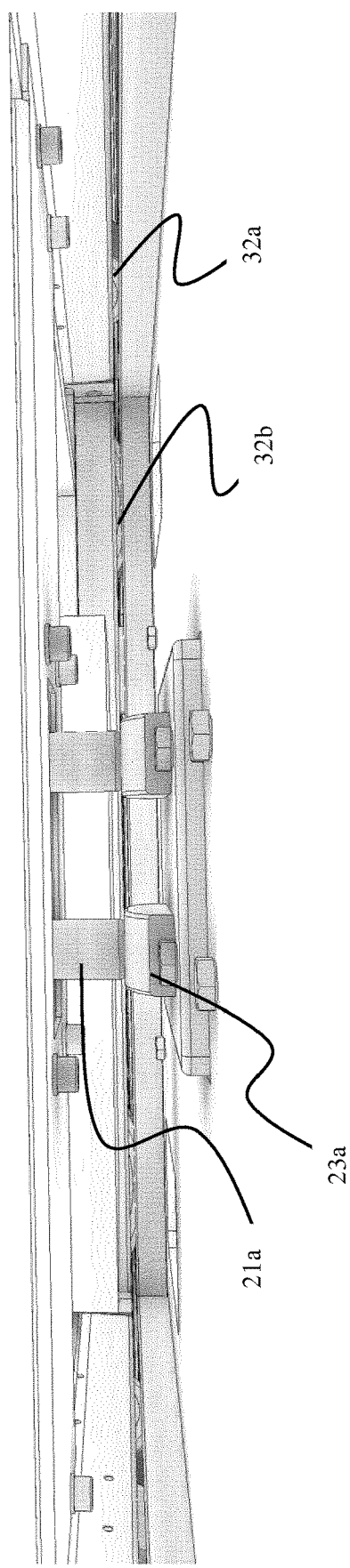

When the container transfer vehicle 6' is at a position above the charging station 22, the first contact surfaces 25 are spaced from, and arranged directly above, the second contact surfaces 26, see FIGS. 17 and 19. The second set of wheels 32b is not in contact with, and has its lowest level arranged above the upper level of, the transfer rail grid 5.

Figure 18:
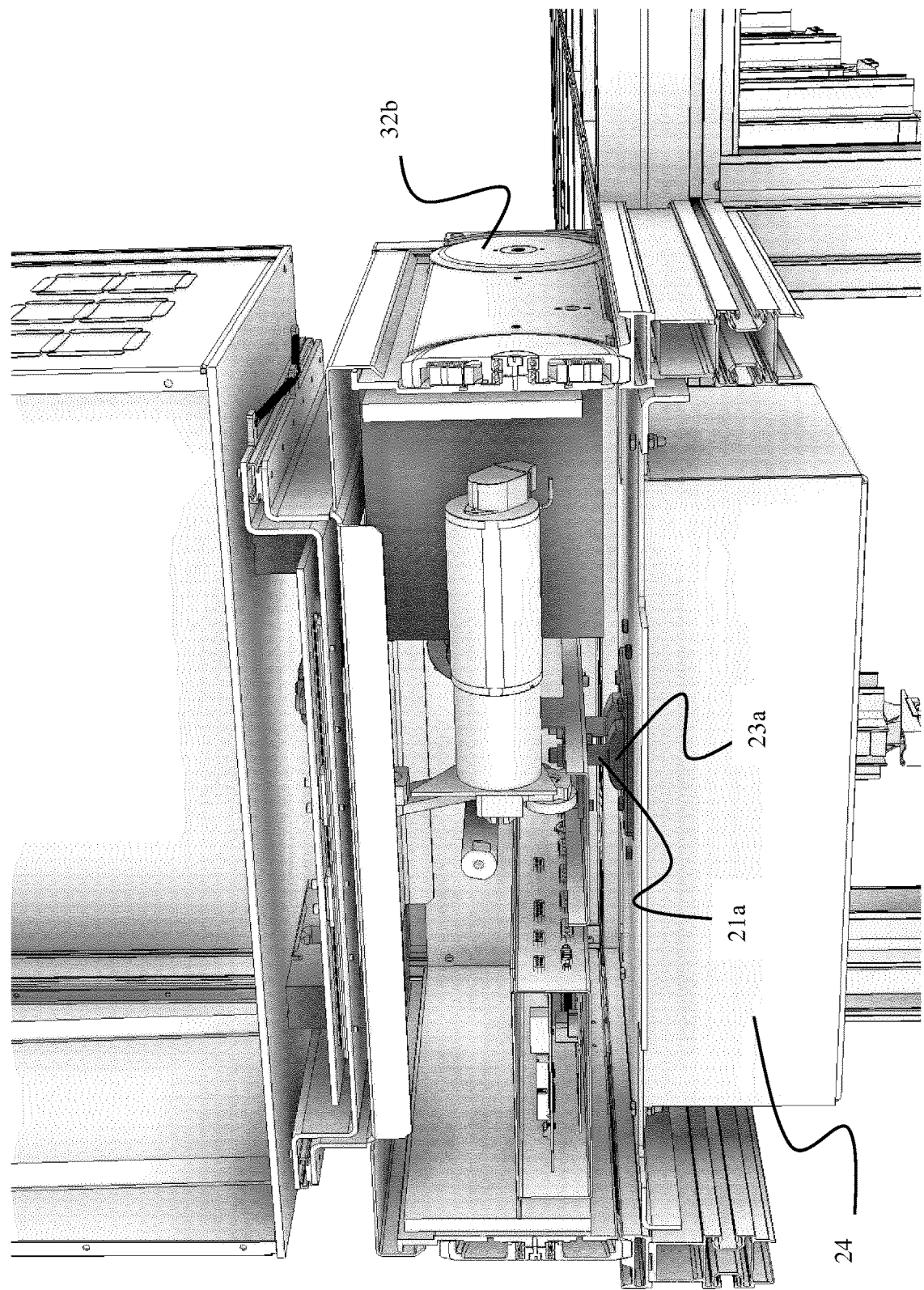

To initiate charging of the rechargeable battery 20, the first set of wheels 32a (not shown) is moved vertically from the first position to the second or third position, in which the second set of wheels 32b is in contact with the transfer rail grid 5, see FIGS. 18 and 19. When the first set of wheels 32a is moved away from the transfer rail grid 5, the first contact surfaces 25 are lowered towards, and brought into contact with, the second contact surfaces 26. During charging, the first set of wheels 32a is preferably arranged in the second position, wherein both the first set of wheels 32a and the second set of wheels 32b are in contact with the transfer rail grid 5. Rail grids are not always completely level, and by having the first set of wheels in the second position any unintended lateral movement of the container vehicle is prevented.

An advantage of the inventive charging system is that the charging interface made up of the first contact surfaces and the second contact surfaces may have a very robust and wear resistant construction.

Further, the charging interface allows for a higher charging capacity than the prior art horizontally arranged plug/socket connections since the area of the first and second contact surfaces may be increased without introducing problems related to coupling/decoupling of the charging interface due to increased friction.

The construction of the charging system, which requires that the container transfer vehicle is arranged above the charging station, is also advantageous in that the first and second contact surfaces are pushed together by use of the weight of the container transfer vehicle. The high contact force or pressure provided between the first and second contact surfaces contributes to low electrical contact resistance.

It is also envisioned that the first contact surfaces and the second contact surfaces may form parts of a vertically arranged plug/socket interface. The force required for connection/disconnection of a vertical plug/socket connection when used in the present charging system is provided by the weight of the vehicle and the force of a wheel displacement motor, respectively. Consequently, the force required for a vertical plug/socket connection/disconnection is not limited by the friction between the wheels and the rails as in the prior art systems.

When used in connection with container transfer vehicles 6, a charging station may advantageously be arranged such that a transfer vehicle is charged while positioned below a transfer column 119,120, see FIG. 6 (the charging station is not shown). In other words, the charging station may be arranged in a grid cell arranged directly below a transfer column. In this manner, the transfer vehicles may be utilized even more efficiently as they may be charged during operation.

An embodiment of a charging system featuring a container handling robot 300' having a cantilever construction is shown in FIGS. 20-23. The container handling vehicle 300' is distinguished from the prior art container handling vehicle 300 described in the background section, in at least by featuring charge-receiving elements 21a,21b (see FIGS. 22 and 23) as described above. The container handling vehicle 300' is arranged on a top rail grid 108 of a storage grid structure 104 as described by reference to FIGS. 1-13.

Figure 20:
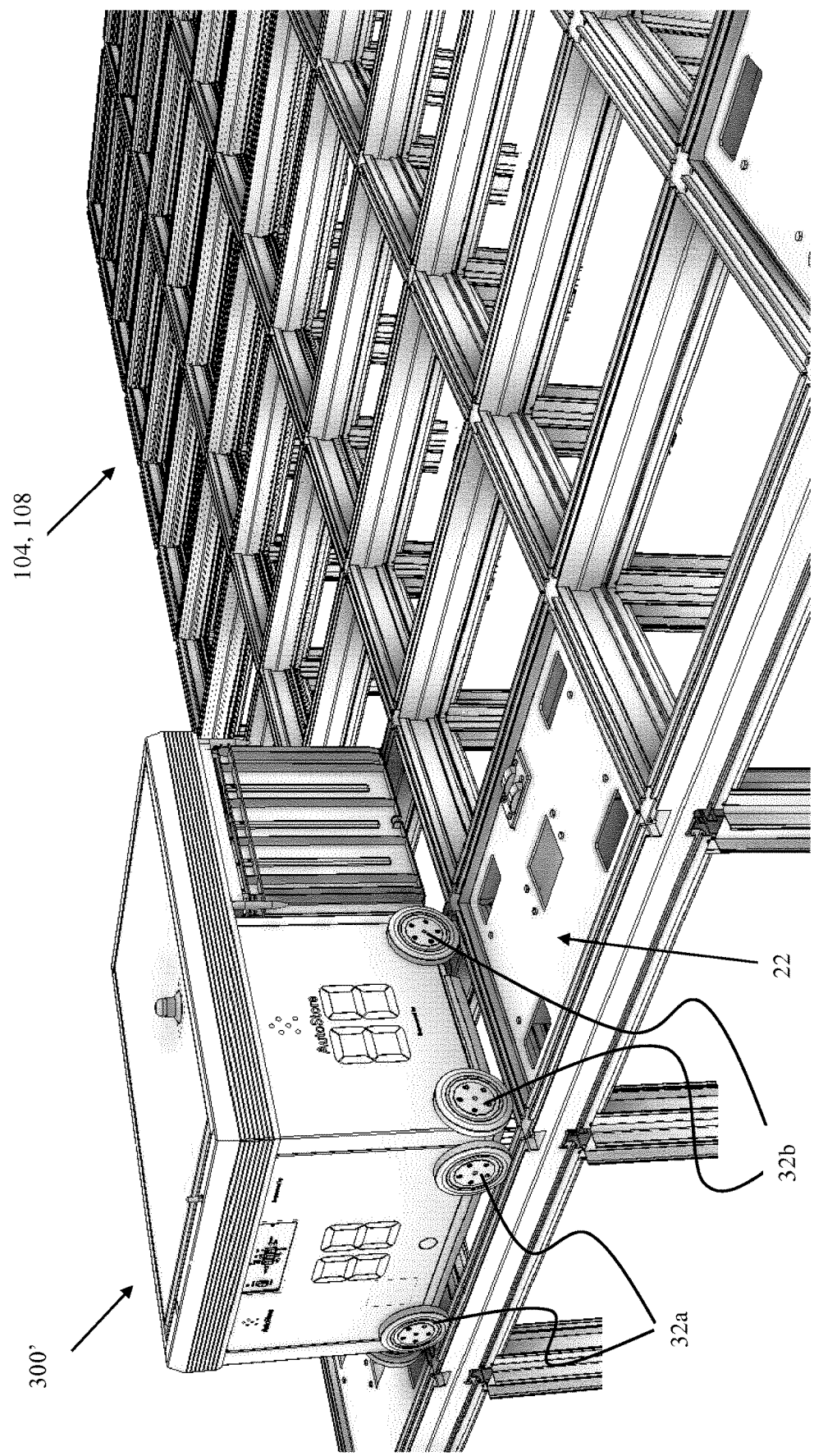
FIG. 20 is a perspective view of a container handling vehicle and charging station according to the invention arranged on a top rail grid.

In FIG. 20, the first set of wheels 32a is in the first position, and the container handling vehicle 300' is shown before entering a grid cell having a charging station 22.

Figure 21:
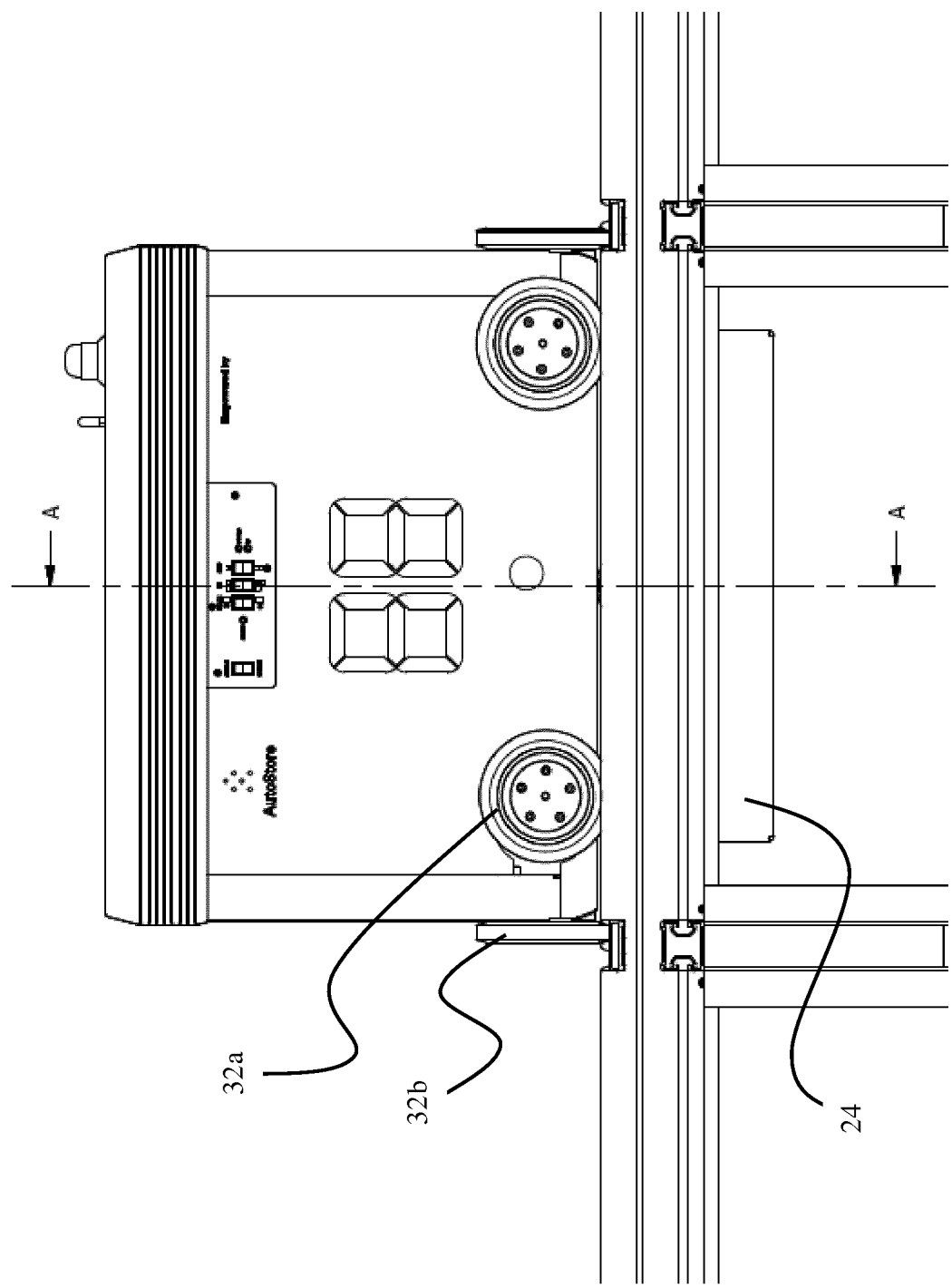
FIG. 21 is a side view of the container handling vehicle in FIG. 20.
Figure 22:
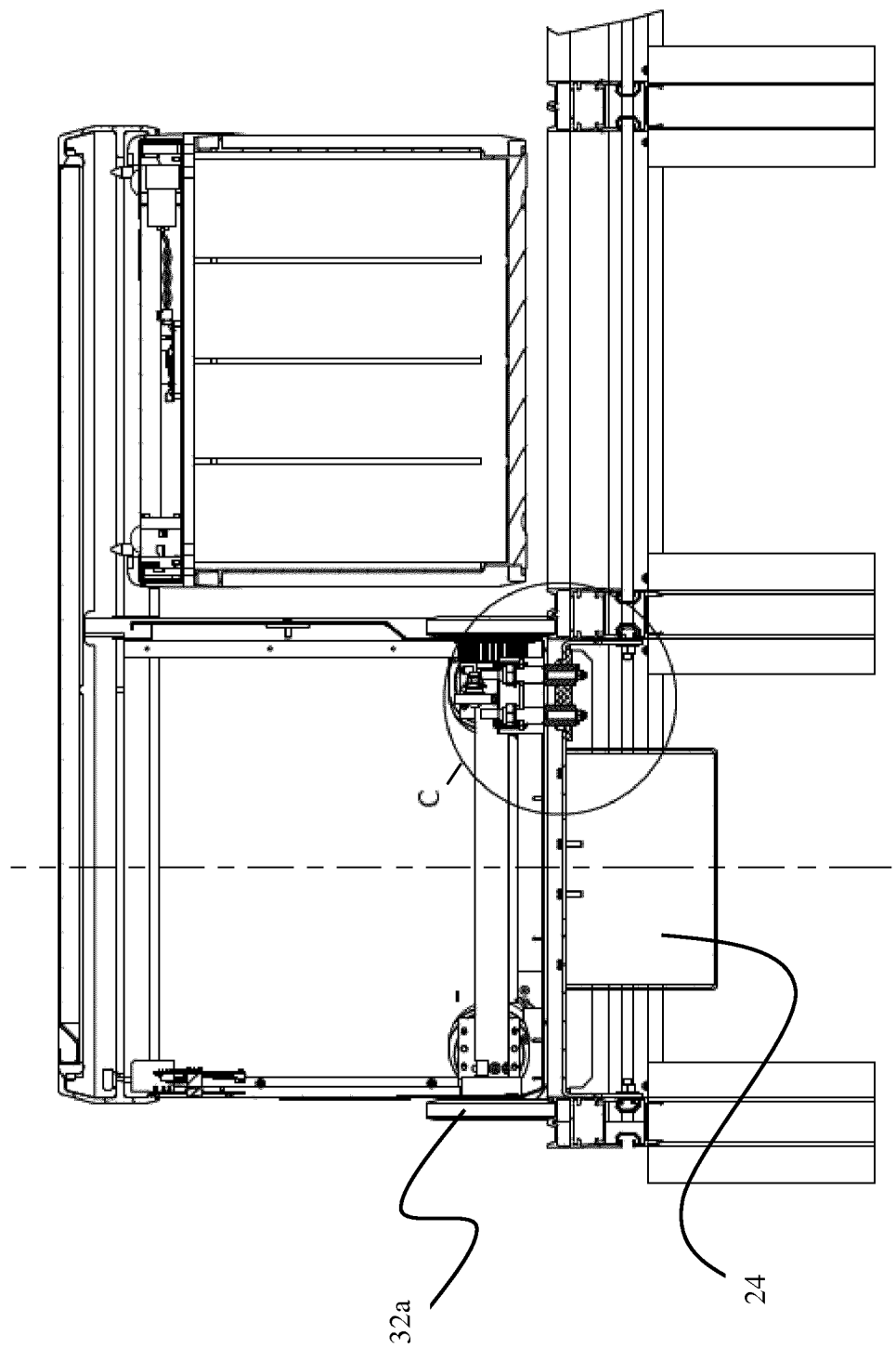
FIG. 22 is a cross-sectional view of the container handling vehicle in FIG. 21.
Figure 23:
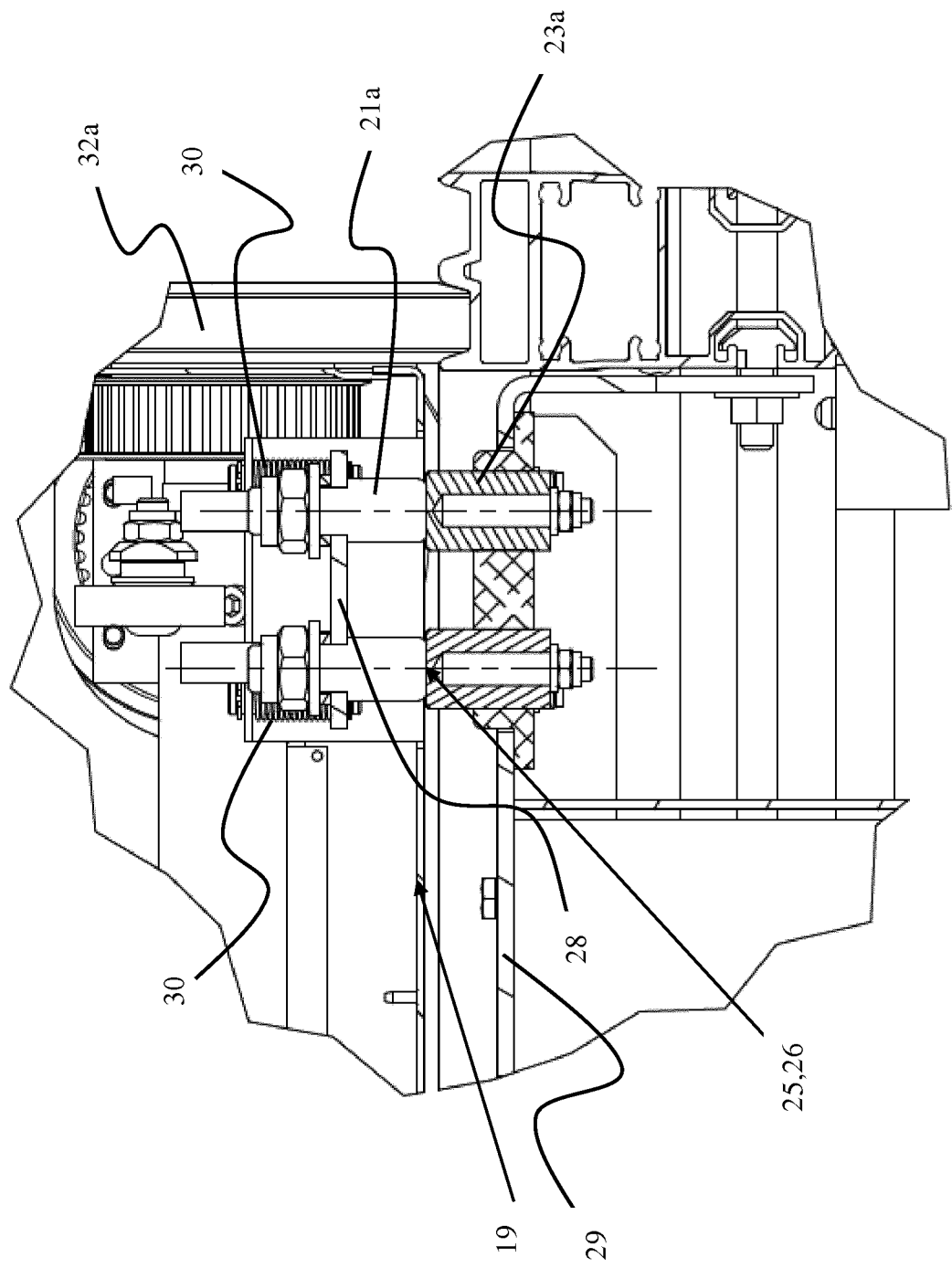
FIG. 23 is an enlarged view of detail C in FIG. 21.

In FIGS. 21-23, the container handling vehicle 300' is positioned above the charging station 22 and the first set of wheels 32a is in the second position.

The container handling vehicle 300' and the charging station 22 in FIGS. 20-23 have the same technical features related to the inventive charging system as described above for the container transfer vehicle 6' and the charging station 22 in FIGS. 15-19. The charge-receiving elements 21a,21b are connected to a bottom section 19 of the vehicle body by a resilient assembly 28,30 allowing a resilient vertical movement of the charge-receiving elements. The resilient assembly provides a biasing force to the charge-receiving elements in a downwards direction. In the specific embodiment shown in FIG. 23, the resilient assembly comprises a plate element 28 and four springs 30 (i.e. resilient elements), only two of the springs are shown in FIG. 23.

Other embodiments of resilient assemblies are envisioned. The resilient assembly enables the charge-receiving elements 21a,21b to be pushed in a vertical direction, against the biasing force, by the charge-providing elements 23a,23b of the charging station 22. The resilient movement ensures that the charge-receiving elements may be pushed against the charge-providing elements by use of the weight of the container handling vehicle, while at the same time keeping the container handling vehicle in a stable position. To obtain a stable position, the biasing force is less than the downwards force caused by the weight of the container handling vehicle.

Further, the resilient assembly may compensate for slight deviations of the first contact surfaces and the second contact surfaces from the horizontal plane ensuring that the first and second contact surfaces are in close contact for optimum current transfer.

In further embodiments, the described advantages of having the charge-receiving elements 21a,21b connected by a resilient assembly 28,30 may alternatively be obtained by a charging system, wherein the charge-providing elements 23a,23b are connected to the support structure 29 by a resilient assembly. However, it is noted that having the resilient assembly 28,30 on the container handling vehicle is advantageous in that it allows for easy access without shutting down the storage system if service/repair is needed.

Figure 24:
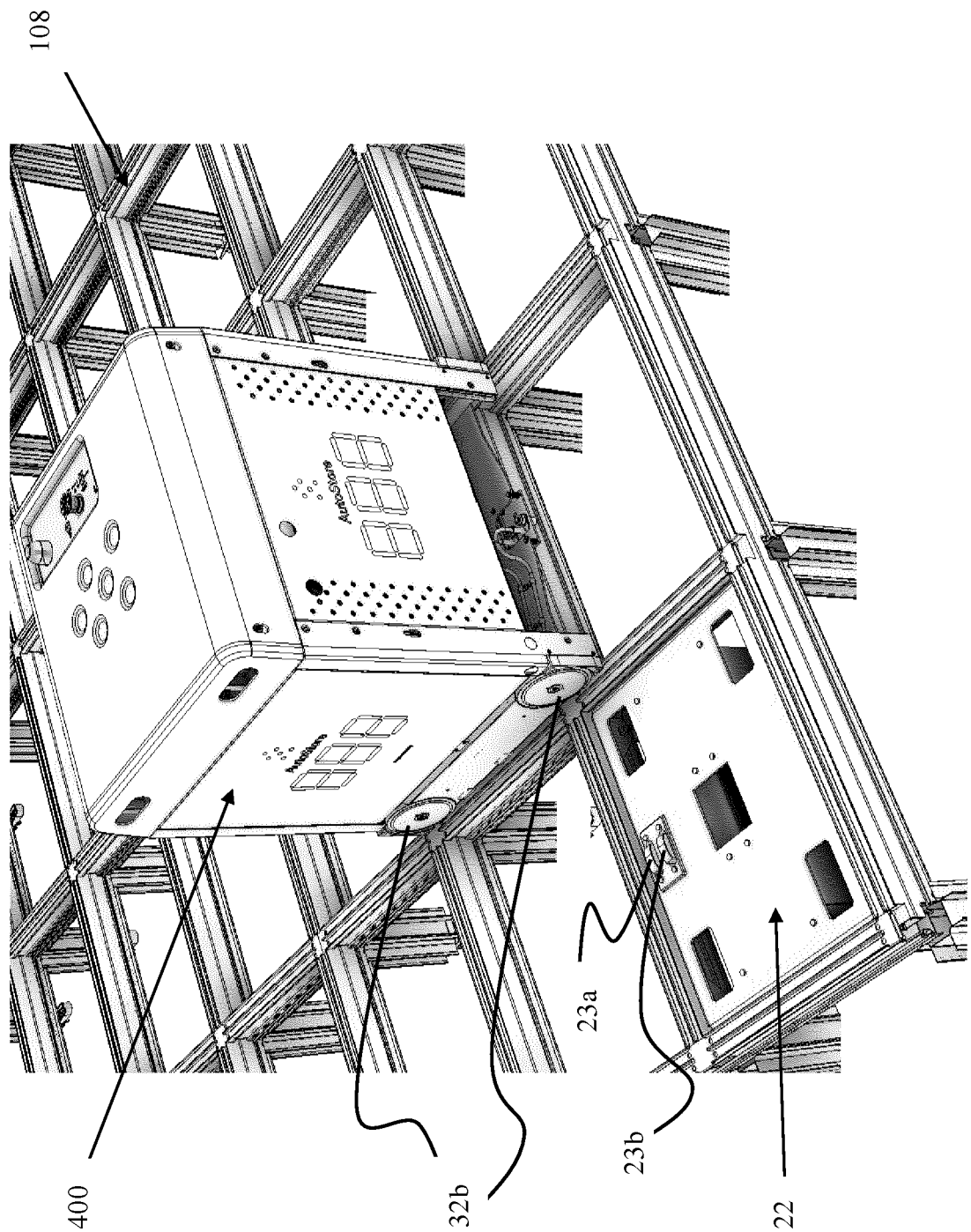
FIG. 24 is a perspective view of a container handling vehicle and charging station according to the invention arranged on a top rail grid.

Yet an embodiment of a charging system featuring a container handling vehicle 400 arranged on a top rail grid 108 is shown in FIGS. 24-25. Similar container handling vehicles 400 are disclosed in PCT/EP2018/077713 and PCT/EP2018/077732. The charging system comprises the same features as described above by reference to FIGS. 15-23. In FIG. 25A, the first set of wheels 32a is in the first position, and the charge-receiving elements 21a,21b are spaced from the charge-providing elements 23a,23b. In FIG. 25B, the first set of wheels 32a is in the second or third position, and the charge-receiving elements 21a,21b are in contact with the charge-providing elements 23a,23b.

In the charging stations shown in FIGS. 15-25, each of the charge-providing elements 23a,23b features inclined guide surfaces 31 arranged on opposite ends of the second contact surfaces 26. The guide surfaces 31 extend from the level of the second contact surfaces 26 to a level below the level of the first contact surfaces 25 when the first set of wheels is in the third position, i.e. the guide surfaces 31 extend to a level below the lowest level at which the first contact surfaces 25 may be arranged. Commonly, the guide surfaces 31 will extend to a level below the upper level of the rail grid. Further, the guide surfaces 31 are inclined in the first direction X, i.e. in the direction from which the container vehicle enters the position above the charging station.

The embodiments of the charging system disclosed in FIGS. 15-25 have in common that the charge-providing elements are arranged such that the container vehicle (i.e. the container transfer vehicle 6' or the container handling vehicle 300',400) is positioned above the charging station by moving the container vehicle in the first direction X by having the first set of wheels 32a in the first position. In this manner, the first contact surfaces 25 are at a level above the level of the second contact surfaces 26 when the container vehicle is positioned above the charging station 22.

In other embodiments of the charging system (not shown), the charge-providing elements 23a,23b may be arranged having the guide surfaces 31 extending in the second direction Y. In these embodiments, the container vehicle may enter the position above the charging station from either the first direction X or the second direction Y. When the container vehicle enters the position above the charging station from the second direction Y, the first set of wheels is in the third position and the first contact surfaces are at a level below the second contact surfaces and above the lowest level of the guide surfaces. The guide surfaces will push the first contact surfaces in a vertical direction, i.e. the first contact surfaces are caused to retract upwards by the guide surfaces, until the container vehicle is positioned above the charging station and full contact between the first and second contact surfaces is obtained. In alternative embodiments, it is envisioned that the charge-receiving elements 21a,21b features the guide surfaces 31 instead of the charge-providing elements.

Charge-providing elements 23a,23b or charge-receiving elements 21a,21b featuring inclined guide surfaces extending in both the first direction X and the second direction Y are also envisioned.

The guide surfaces are advantageous in that they allow for charging stations wherein the container vehicle may enter the position above the charging station from any of the first and second direction. However, the guide surfaces are not a requirement when the charging system is used as described in FIGS. 15-25, that is the container vehicle enters the charging station with the first set of wheels in the first position, i.e. the container vehicle moves in the X-direction.

Figure 26:
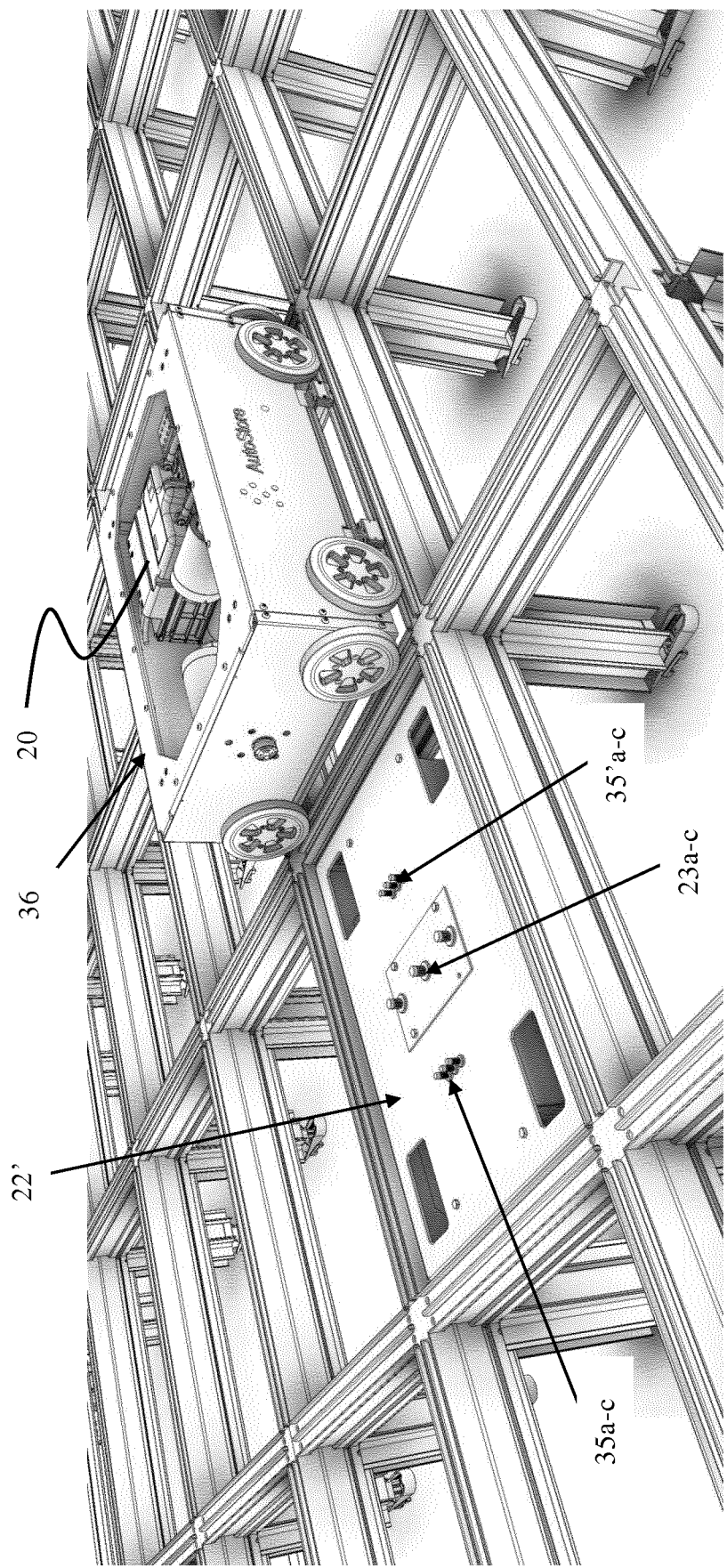
FIGS. 26-28 are perspective views of a further embodiment of the charging system.
Figure 27:
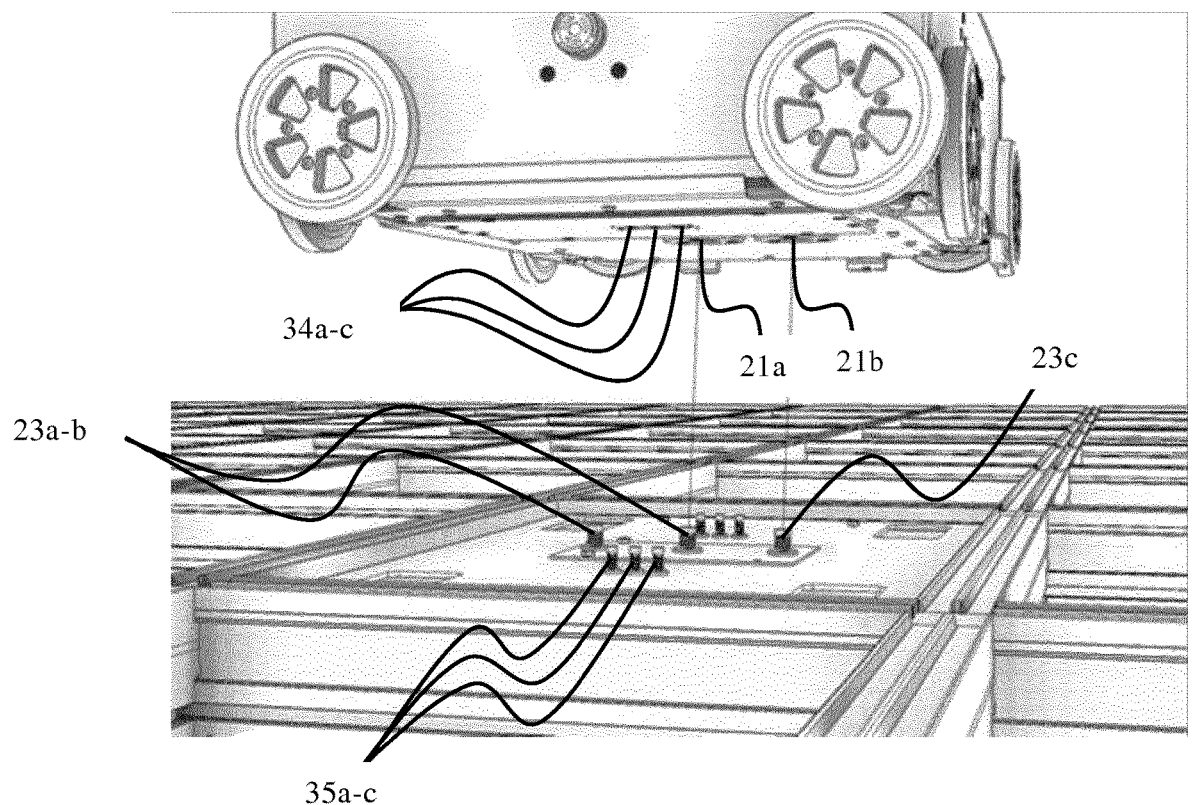
Figure 28:
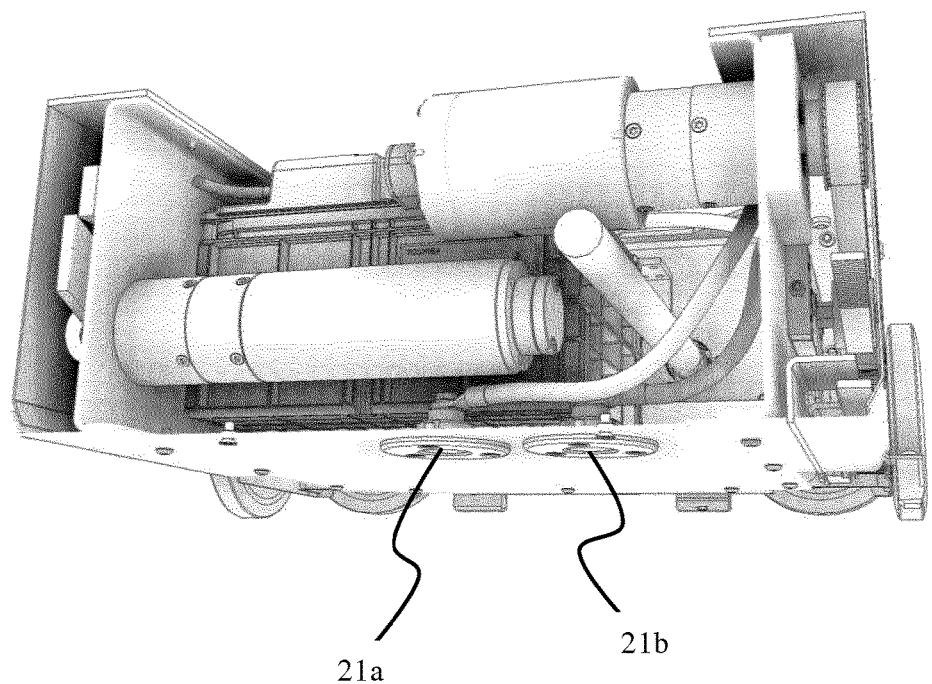

A further embodiment of the charging system is disclosed in FIGS. 26-28. The charging system is shown by use of a wheel base 36 upon which various container vehicle modules (not shown but may for instance be a container carrier to provide a container transfer vehicle 6' or a cantilevered section to provide a container handling vehicle 300') may be connected. In addition to the charge-providing elements 23a,23b and the charge-receiving elements 21a,21b of the embodiments above, the charging system in FIGS. 26-28 comprises a further charge-providing element 23c, as well as three first signal transfer elements 34a-c arranged on the wheel base 36 and connected to the power source 20 (i.e. to the control system controlling the charging of the power source), and the charging station features two sets of three corresponding second signal transfer element 35a-c,35'a-c connected to the power source charger 22'. The first and second signal transfer elements are arranged to be in contact when the charge-providing elements 23a,23b,23c are in contact with the charge-receiving elements 21a,21b. The presence of the additional charge-providing element 23c and the two sets of second signal transfer elements 35a-c,35'a-c ensures that the wheel base 36 may be charged by the charging station even if it is turned 180 degrees relative the charging station when positioned upon a rail grid. This feature is especially advantageous when the wheel base 36 is part of a container handling vehicle having a cantilever section.

The disclosed container transfer vehicle 6', container handling vehicles 300',400 and wheel base 36 comprise a rechargeable battery as a rechargeable power source. However, in other embodiments it is envisioned that the rechargeable power source may be any suitable power source that may be recharged by electric current, including a capacitor and similar.

In the disclosed embodiments, the first contact surfaces 25 and the second contact surfaces 26 are flat. However, in further embodiments it is envisioned that the first contact surfaces 25 and the second contact surfaces 26 may for instance be curved or angled, provided the surfaces are complimentary such that a close contact between the first and second contact surfaces is obtained when they are forced towards each other in a vertical direction.

In the disclosed embodiments, the container vehicles feature two charge-receiving elements 21a,21b and the charging station 22 features two corresponding charge-providing elements 23a,23b. However, in other embodiments the charging system interface may feature any suitable number of charge-receiving elements, such as three, and a corresponding number of charge-providing elements.

REFERENCE NUMERALS

1 Storage system
2 Transfer section
3 Horizontal ceiling profile
4 Vertical support profile
5 Transfer rail grid
6 Container transfer vehicle
7 Transfer vehicle path
8 Picking/stocking station
9 Container access opening
10 Rail circuit
11 First opening (in an external side of a storage grid)
12 An external side of a storage grid
13 Second opening (in an external side of a storage grid)
14 Rail circuit
15 Multi-use transfer grid area
16 Stopper element
17 Operator access passage
18 Support grid
19 Bottom section
20 Rechargeable battery, rechargeable power source
21a,21b Charge-receiving elements
22 Charging station
23a,23b Charge-providing elements
24 Battery charger, power source charger
25 First contact surface
26 Second contact surface
27 Charging plug/pin
28 Plate element (of resilient assembly)
29 Support structure
30 Spring
31 Guide surface
32a,32b Wheel arrangement
33 Wire 34 First signal transfer elements
35 Second signal transfer elements
36 Wheel base
38 Container carrier
100 Framework structure
102 Upright members of framework structure, i.e. vertical column profiles
103 Horizontal members of framework structure
104 Storage grid, storage grid structure
105 Storage column
105' Storage column arranged above a transfer section
106 Storage container
107 Stack
108 Top rail grid, rail system
110 First set of parallel rails in first direction (X), top rails
111 Second set of parallel rails in second direction (Y), top rails
110' Transfer rails, in a first direction of a transfer rail grid
111' Transfer rails, in a second direction, perpendicular to the first direction, of a transfer rail grid
112 Grid column
115 Grid opening
119 Transfer column,
120 Transfer column
122 Grid cell
200 Prior art container-handling vehicle
201,301 Wheel arrangement
300 Second container-handling vehicle
X First direction
Y Second direction
Z Third direction

The invention claimed is:

1. A storage system comprising at least one container vehicle, a horizontal rail grid and a charging system for charging a rechargeable power source of the container vehicle, wherein
the container vehicle comprises a first set of wheels and a second set of wheels for moving the container vehicle upon the rail grid;
the first set of wheels is displaceable in a vertical direction between a first position, wherein the first set of wheels may move the container vehicle in a first direction, a second position, wherein the first and the second set of wheels are in contact with the rail grid such that lateral movement of the container vehicle is prevented, and a third position wherein the second set of wheels may move the container vehicle in a second direction perpendicular to the first direction;
the charging system comprises two separated charge-receiving elements arranged on the container vehicle and connected to the power source, and a charging station comprising two separated charge-providing elements connected to a power source charger; and
each of the charge-receiving elements comprises a first contact surface, and each of the charge-providing elements comprises a second contact surface;
wherein the first contact surfaces are arranged to be in contact with the corresponding second contact surfaces during charging when the container vehicle is positioned above the charge-providing elements and the first set of wheels is in the second position.

2. A storage system according to claim 1, wherein the first contact surfaces are facing downwards, and the second contact surfaces are facing upwards.

3. A storage system according to claim 1, wherein the two charge-receiving elements are arranged at a bottom section of the container vehicle.

4. A storage system according to claim 1, wherein the first contact surfaces and the second contact surfaces are flat and/or the first contact surfaces are complementary with the corresponding second contact surfaces.

5. A storage system according to claim 1, wherein the first contact surfaces and the second contact surfaces are arranged at a level above the rail grid.

6. A storage system according to claim 1, wherein the charge-receiving elements or the charge-providing elements are connected to a resilient assembly arranged to allow the first contact surfaces or the second contact surfaces to move in a vertical direction.

7. A storage system according to claim 6, wherein the resilient assembly is arranged to bias the charge-receiving elements in a downwards direction, or bias the charge-providing elements in an upwards direction.

8. A storage system according to claim 6, wherein the resilient assembly comprises at least one resilient element resiliently connecting the charge-receiving elements relative to a bottom section of the container vehicle.

9. A storage system according to claim 1, wherein the charging station comprises a support structure to which the two charge-providing elements are connected, the support structure arranged within a single grid cell of the rail grid and at a level below the rails of the rail grid.

10. A storage system according to claim 1, wherein the container vehicle comprises at least one first signal transfer element and the charging station comprises at least one corresponding second signal transfer element, the first and second signal transfer element arranged to be in contact when the first contact surfaces are in contact with the corresponding second contact surfaces.

11. A storage system according to claim 1, wherein the second contact surfaces are arranged at a level above a level of the first contact surfaces when the first set of wheels is in the third position and the container vehicle is not positioned above the charging station.

12. A storage system according to claim 1, wherein each charge-providing element comprises inclined guide surfaces arranged on opposite ends of the second contact surface and extending from the level of the second contact surface to a level below the level of the first contact surfaces when the first set of wheels is in the third position, the inclined guide surfaces extending from the second contact surface in the second direction.

13. A method of charging a container vehicle in a storage system, the storage system comprising a horizontal rail grid and a charging system for charging a rechargeable power source of the container vehicle, wherein
the container vehicle comprises a first set of wheels and a second set of wheels for moving the container vehicle upon the rail grid;
the first set of wheels is displaceable in a vertical direction between a first position, wherein the first set of wheels may move the container vehicle in a first direction, a second position, wherein the first and the second set of wheels are in contact with the rail grid such that lateral movement of the container vehicle is prevented, and a third position wherein the second set of wheels may move the container vehicle in a second direction perpendicular to the first direction;
the charging system comprises two charge-receiving elements arranged on the container vehicle and connected to the power source, and a charging station comprising two charge-providing elements connected to a power source charger; and each of the charge-receiving elements comprises a first contact surface, and each of the charge-providing elements comprises a second contact surface;
wherein the method comprises the steps of:
moving the container vehicle in the first direction towards the charging station;
stopping the container vehicle in a position above the charge-providing elements; and
displacing the first set of wheels from the first position to the second position to lower the first contact surfaces into contact with the second contact surfaces.

* * * * *